(12) United States Patent
Ushigome

(10) Patent No.: US 8,681,424 B2
(45) Date of Patent: Mar. 25, 2014

(54) DIFFRACTIVE OPTICAL ELEMENT CONTAINING GRATING SURFACE AND GRATING WALL SURFACE, AND OPTICAL SYSTEM HAVING THE SAME

(75) Inventor: Reona Ushigome, Utsonomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 12/833,609

(22) Filed: Jul. 9, 2010

(65) Prior Publication Data

US 2011/0013284 A1 Jan. 20, 2011

(30) Foreign Application Priority Data

Jul. 14, 2009 (JP) ................................ 2009-165610

(51) Int. Cl.
*G02B 5/18* (2006.01)
(52) U.S. Cl.
CPC ...................................... *G02B 5/188* (2013.01)
USPC ............................ 359/576; 359/573; 359/575
(58) Field of Classification Search
USPC ........................... 359/574–576, 558, 566, 569
See application file for complete search history.

(56) References Cited

U.S. PATENT DOCUMENTS

| 7,301,702 | B2 * | 11/2007 | Nakai | ........................... 359/576 |
| 7,710,651 | B2 | 5/2010 | Yasui | |
| 2006/0289731 | A1 | 12/2006 | Shimomura et al. | |
| 2009/0190224 | A1 * | 7/2009 | Iwasa | ........................... 359/576 |

FOREIGN PATENT DOCUMENTS

| JP | 9-127321 A | 5/1997 |
| JP | 11-084118 A | 3/1999 |
| JP | 2000-002847 A | 1/2000 |
| JP | 2003-222792 A | 8/2003 |
| JP | 2004-252100 A | 9/2004 |
| JP | 2005-070124 A | 3/2005 |
| JP | 2005-292571 A | 10/2005 |
| JP | 2007-299480 A | 11/2007 |
| JP | 2008-203821 A | 9/2008 |
| JP | 2008-241734 A | 10/2008 |

* cited by examiner

*Primary Examiner* — Scott J Sugarman
*Assistant Examiner* — Robert E Tallman
(74) *Attorney, Agent, or Firm* — Carter, DeLuca, Farrell & Schmidt LLP

(57) ABSTRACT

A diffractive optical element has higher diffraction efficiency of diffracted light of a designed order in a visible wavelength range. The diffractive optical element includes a diffraction grating part provided on a lens surface of an optical system and constituted by laminating first and second diffraction gratings made of two different materials. Each of the first and second diffraction gratings includes a grating surface and a grating wall surface. The grating surfaces of the first and second diffraction gratings are in contact with each other. The diffraction grating part has the designed order of at least +2nd order and has a grating height of at least 6 μm.

12 Claims, 22 Drawing Sheets

DIFFRACTIVE OPTICAL ELEMENT CONTAINING GRATING SURFACE AND GRATING WALL SURFACE, AND OPTICAL SYSTEM HAVING THE SAME

BACKGROUND OF THE INVENTION

1. Field of the Invention

The present invention relates to a diffractive optical element and an optical system having the same, which are suitable for an image pickup optical system, an observation optical system, or the like.

2. Description of the Related Art

Conventionally, a method of reducing a chromatic aberration of a lens system (an optical system) by providing a diffractive optical element having a diffraction grating in a part of the lens system has been known. Generally, the diffraction grating is constituted by a blazed structure constituted of a grating surface and a grating side surface. The diffraction grating having the blazed structure can diffract light with high efficiency for diffracted light having a specific one order (hereinafter, referred to as a "specific order" or a "designed order") and a specific wavelength. A structure of the diffractive optical element for obtaining sufficiently-high diffraction efficiency of the specific order in an entire visible wavelength range is known (Japanese Patent Laid-open No. H9-127321). The diffractive optical element disclosed in Japanese Patent Laid-open No. H9-127321 constitutes a diffraction grating part by adhesively arranging two diffraction gratings and a material of each diffraction grating and a height of the grating part of each diffraction grating are appropriately set (hereinafter, such a diffraction grating part is referred to as a "contacting two-layer DOE"). With respect to diffracted light having a desired order, high diffraction efficiency is realized over a wide wavelength range. The designed order is not defined. The diffraction efficiency is represented as a ratio of light intensity of the diffracted light of each order with respect to the light intensity of entire transmitted luminous flux.

The luminous flux which enters the grating wall surface of the grating part forming the diffraction grating exhibits behaviors such as reflection and refraction which are different from those on the grating surface, and as a result, it generates unnecessary light (flare). Therefore, a diffractive optical element which suppresses generating the unnecessary light on the grating wall surface is known (Japanese Patent Laid-open No. 2005-292571). The diffractive optical element disclosed in Japanese Patent Laid-open No. 2005-292571 optimizes an angle of the grating wall surface with respect to luminous flux entering the diffractive optical element at an obliquely incident angle (an off-screen light incident angle) with reference to a principal ray incident angle (a designed incident angle or an imaging light incident angle). Thus, it prevents the unnecessary light generated on the grating wall surface from reaching the imaging plane. With respect to the designed order, a diffractive optical element having the designed order equal to or greater than +2nd order is known (Japanese Patent Laid-open No. 2005-70124). Japanese Patent Laid-open No. 2005-70124 discloses a diffractive optical element having the designed order equal to or greater than +2nd order, and the grating size of the grating part is large so as to be easily manufactured.

In an optical system using the diffractive optical element, the unnecessary light is generated with respect to the luminous flux entering the diffractive optical element at an obliquely incident angle (an off-screen light incident angle) with reference to a principal ray incident angle. When a part of the unnecessary light reaches an imaging plane, the image performance is deteriorated. With respect to this problem, previously, behaviors of the luminous flux entering the grating surface and the grating wall surface of the grating part of the diffraction grating are separately considered, and the behavior on the grating surface is treated as a diffraction phenomenon caused by the blazed structure, and the behavior on the grating wall surface is treated as a phenomenon of a geometric optics. However, it is difficult to treat the grating surface and the grating wall surface of the grating part separately, and in the conventional method, the unnecessary light reaching the imaging plane is not sufficiently suppressed.

SUMMARY OF THE INVENTION

A diffractive optical element as one aspect of the present invention has higher diffraction efficiency of diffracted light of a designed order in a visible wavelength range. The diffractive optical element includes a diffraction grating part provided on a lens surface of an optical system and constituted by laminating first and second diffraction gratings made of two different materials. Each of the first and second diffraction gratings includes a grating surface and a grating wall surface. The grating surfaces of the first and second diffraction gratings are in contact with each other. The diffraction grating part has the designed order of at least +2nd order and has a grating height of at least 6 μm.

Further feature of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. A diffractive optical element of the present invention is constituted of two different materials in an optical system in which the diffractive optical element is provided on a lens surface. In addition, it is configured so that a diffraction grating part which has a structure of laminating first and second diffraction gratings each having a grating height of a grating part of at least 6 μm is held between substrates having a lens function. In the structure, grating surfaces of grating parts of the first and second diffraction gratings contact with each other (adhere tightly to each other). In the diffractive optical element, each component constituting the diffraction grating part is appropriately set so that diffraction efficiency of diffracted light is improved in a visible wavelength range containing a g-line up to a C-line and in a designed order (specific order) equal to or greater than 2.

In the embodiment, m is an integer equal to or greater than 2, P is a grating pitch of the grating part, n0 (λ) is a refractive index of a material of the diffraction grating at an incident side of the first and second diffraction gratings in a wavelength λ. The wavelength λ is an arbitrary wavelength in the visible wavelength range. In the embodiment, light enters the diffraction grating part at an obliquely incident angle θ1' with respect to a designed incident angle θ1. In addition, integers adjacent to m' which meets the following expression are defined as nm1-th and nm2-th orders (nm1>nm2).

$$m' = m + P \times n0(\lambda) \times (\sin\theta1 - \sin\theta1')/\lambda$$

In this case, each component of the diffraction grating part is set so that both diffraction efficiencies of the diffracted light of the nm1-th and nm2-th orders in the diffraction grating having a designed order m are lower than those of the diffracted light of n11 and n12 orders in the diffraction grating part having a designed order of 1.

Figure 1:
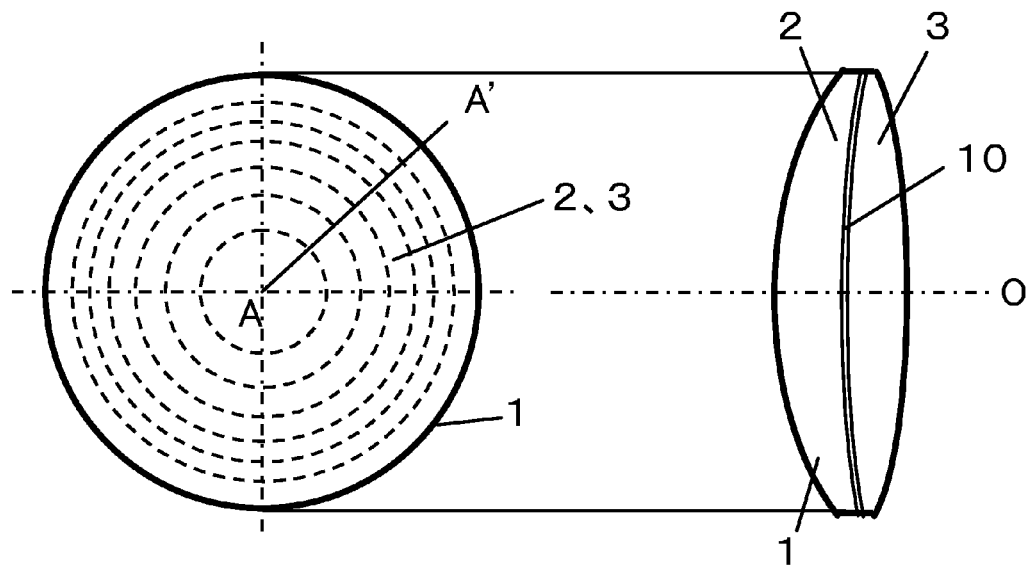
FIG. 1 is a main schematic diagram of a diffractive optical element.
Figure 2:
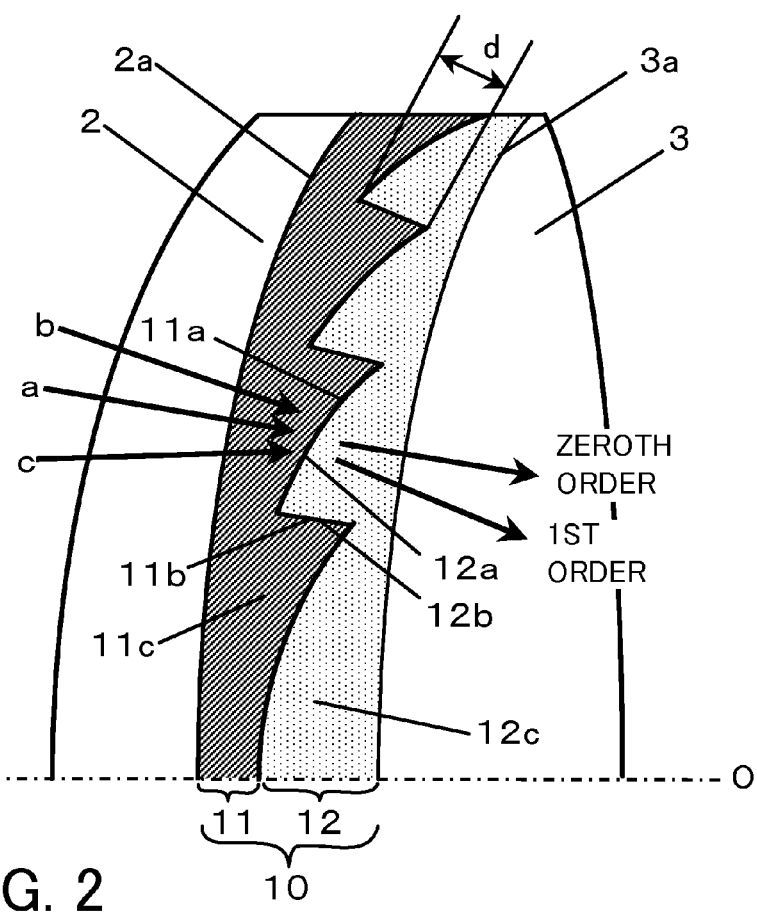
FIG. 2 is an enlarged cross-sectional diagram of an element structure of a diffractive optical element.
Figure 3:
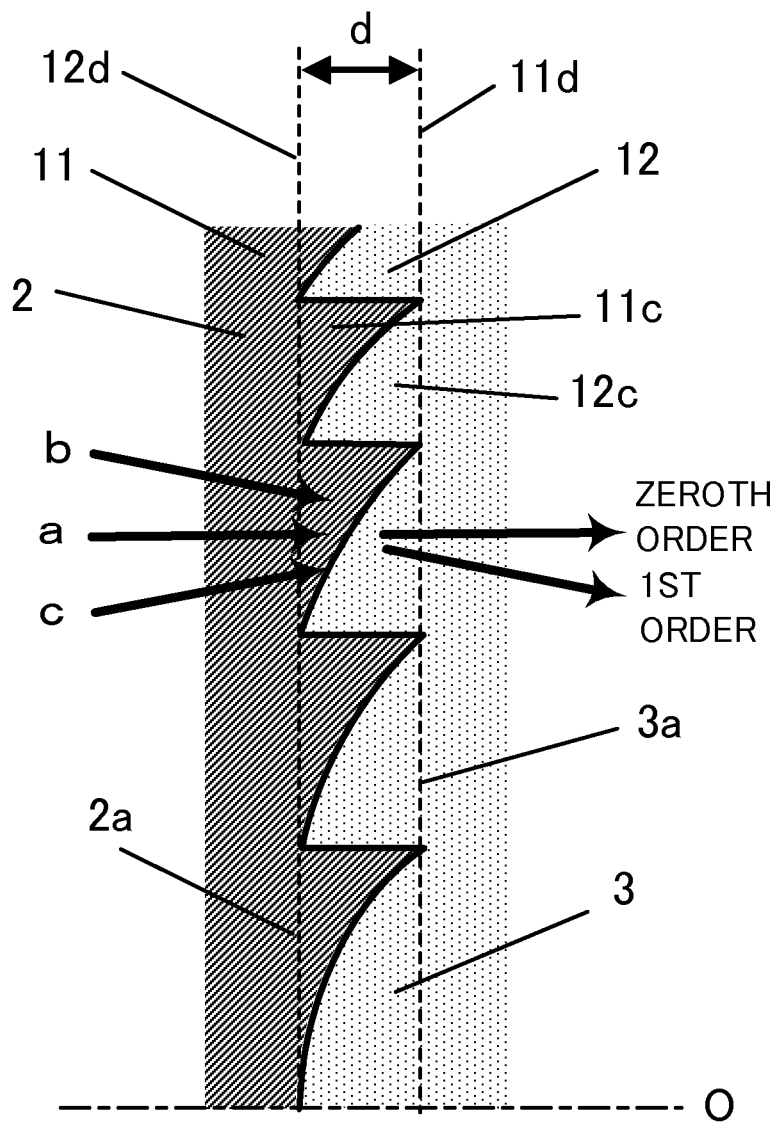
FIG. 3 is a schematic diagram of an element structure (a diffraction grating part) of a diffractive optical element.

Next, a problem about a behavior of a grating wall surface in a conventional diffractive optical element will be described. FIG. 1 is a front view and a side view of the diffractive optical element. The diffractive optical element 1 is formed by providing a diffraction grating part 10 on surfaces of substrates 2 and 3 each constituted of a plane plate or a lens. The surfaces of the substrates 2 and 3 on which the diffraction grating part 10 is formed have curved surfaces. The diffraction grating part 10 has a concentric diffraction grating shape centering on an optical axis O, and has a lens function. FIG. 2 is an enlarged view of a part of a cross-sectional shape of the diffractive optical element 1 in FIG. 1, obtained by cutting on A-A' cross section in the drawing. For easy description, as illustrated in FIG. 3, the surfaces of the substrates 2 and 3 on which the diffraction grating part 10 is formed are plane surfaces. In this case, an envelope surface which is obtained by jointing grating end parts of the diffraction grating part 10 is a plane surface vertical to the optical axis O. Furthermore, all the surface normals of the envelope surface at intersections with the above grating end parts are parallel to a direction of the optical axis O.

In the conventional diffractive optical element, generally, diffraction efficiency is calculated by using the scalar diffraction theory to perform a design evaluation. First of all, the diffraction efficiency using a calculation based on the conventional scalar diffraction theory will be described. In a contacting two-layer DOE which is constituted by contacting two diffraction gratings, a condition where diffraction efficiency of the diffracted light having an order in which the designed wavelength is λ0 is maximized is as follows. A value obtained by adding optical path length differences between peaks and valleys of the grating part, i.e. differences of the optical path length between light beams passing through the peak and the valley respectively, over all the diffraction gratings is determined so as to be an integral multiple of the wavelength. Accordingly, in the diffraction grating part 10 of the present embodiment illustrated in FIGS. 2 and 3, a conditional expression in which the diffraction efficiency of the diffracted light having a diffraction order m is maximized is as follows.

$$\pm(n1-n2) \times d = m \times \lambda 0 \quad (1)$$

In Expression (1), n1 is a refractive index of a material forming a first diffraction grating 11 at a wavelength λ0, n2 is a refractive index of a material forming a second diffraction grating 12 at the wavelength λ0, d is a grating height of grating parts 11c and 12c of the first diffraction grating 11 and the second diffraction grating 12, and m is a diffraction order. In the embodiment, an order of light beam which is diffracted in a downward direction from zero-order diffracted light in FIGS. 2 and 3 is defined as a positive diffraction order, and an order of light beam which is diffracted in an upward direction from the zero-order diffracted light in FIGS. 2 and 3 is defined as a negative diffraction order.

The sign of the grating height in Expression (1) is negative when the refractive indexes n1 and n2 of the grating forming material of the grating parts 11c and 12c which forms the diffraction gratings 11 and 12 satisfy the relation of n1<n2 and the grating shape is configured so that the grating height of the diffraction part 11c of the diffraction gratings 11 increases from bottom to top in the drawing. The sign is also negative when the grating shape is configured so that the grating height of the grating part 12c of the diffraction grating 12 decreases. On the other hand, the sign is positive when n1>n2 is met and the grating shape is configured so that the grating height of the grating part 11c of the diffraction grating 11 decreases from bottom to top in the drawing. The sign is also positive when the grating shape is configured so that the grating height of the grating part 12c of the diffraction grating 12 increases.

In other words, when the configuration is as illustrated in FIGS. 2 and 3 and the relationship between the refractive indexes n1 and n2 satisfies n1<n2, Expression (1) is represented as the following Expression (2).

$$(n2-n1) \times d = m \times \lambda 0 \quad (2)$$

In the configuration illustrated in FIGS. 2 and 3, diffraction efficiency η(λ) at a designed wavelength λ0 can be represented as the following Expression (3).

$$\eta(\lambda) = \mathrm{sinc}^2[\pi\{m - (n2-n1)d/\lambda\}] = \mathrm{sinc}^2[\pi\{m - \varphi 0/\lambda 0\}] \quad (3)$$

$$\varphi 0 = (n2-n1) \times d \quad (4)$$

In expression (3), φ0 is represented as the following Expression (4), and d is a grating height of the grating parts 11c and 12c of the diffraction gratings 11 and 12. Generally, the grating height of the diffraction grating is defined by a grating end in a direction vertical to a grating period direction (surface normal direction) and a height of the grating groove. When the grating wall surfaces 11b and 12b are shifted from a surface normal, the grating end is deformed, or the like, it is defined by a distance of an intersection of an extension line of the grating surface and the surface normal.

The diffractive optical elements disclosed in Japanese Patent Laid-open Nos. H9-127321 and 2005-292571 calculate diffraction efficiency by using the scalar diffraction theory to perform a design evaluation. It is known that the scalar diffraction theory can perform the calculation with high accuracy if a grating pitch of the diffraction grating is sufficiently greater than the wavelength. However, it only defines the behavior of a diffraction phenomenon by a grating surface of the diffraction grating and does not consider a behavior of the grating wall surface of the diffraction grating. In the actual diffractive optical element, since the grating wall surface as well as the grating surface is provided, the wall surface part also needs to be considered.

The conventional method of calculating the grating wall surface disclosed in Japanese Patent Laid-open No. 2005-292571 considers luminous flux entering the grating wall surface of luminous fluxes (arrows b and c in FIG. 3) entering the diffractive optical element at an obliquely incident angle (off-screen light incident angle) with reference to principal ray incident angle (an arrow a in FIG. 3) as a geometric optics phenomenon. In the embodiment, the principal ray incident angle corresponds to a designed incident angle or an imaging light incident angle. Thus, the angle of the grating wall surface is optimized to prevent unnecessary light generated on the grating wall surface from reaching an imaging plane. However, it is difficult to consider the grating surface and the grating wall surface separately.

As a method of performing a calculation considering the wall surface part of the diffractive optical element, a rigorous electromagnetic field calculation is provided. The rigorous electromagnetic field calculation numerically solves the Maxwell equation to be able to rigorously calculate the diffraction efficiencies of transmitted diffracted light and reflected diffracted light of each order with respect to a structure having an arbitrary shape. Conventionally, the rigorous electromagnetic field calculation is often used when the grating pitch is smaller than the wavelength where the accuracy of the scalar theory is deteriorated, but it can also obtain rigorous diffraction efficiency when the grating pitch is sufficiently larger than the wavelength. Furthermore, since the calculation can be performed for an arbitrary shape, the calculation considering the behavior of the grating wall surface, which has not been considered by the scalar diffraction theory calculation of the diffraction grating, is possible. The applicant performed a calculation of the diffractive optical element using a rigorous coupled wave analysis (RCWA) out of the rigorous electromagnetic field calculations. Using the RCWA calculation, the behavior of the grating wall surface is converted into a diffraction order to be able to perform a calculation as a higher-order diffracted light. The calculation order that is a calculation parameter in the RCWA calculation has an order equal to or greater than that converges enough to ignore the unnecessary diffracted light, and the level number (the division number of the diffraction grating) is equal to or greater than a calculation order because the diffracted light depending on the level number is generated as a calculation error.

Specifically, in the diffraction grating part 10, an ultraviolet curable resin mixed with fine particles (nd=1.479, vd=20.7, θgF=0.404, n550=1.483) is used as a grating forming material which forms the diffraction grating 11. An ultraviolet curable resin (nd=1.524, vd=51.3, θgF=0.539, n550=1.524) is used as a grating forming material which forms the diffraction grating 12.

Figure 4A:
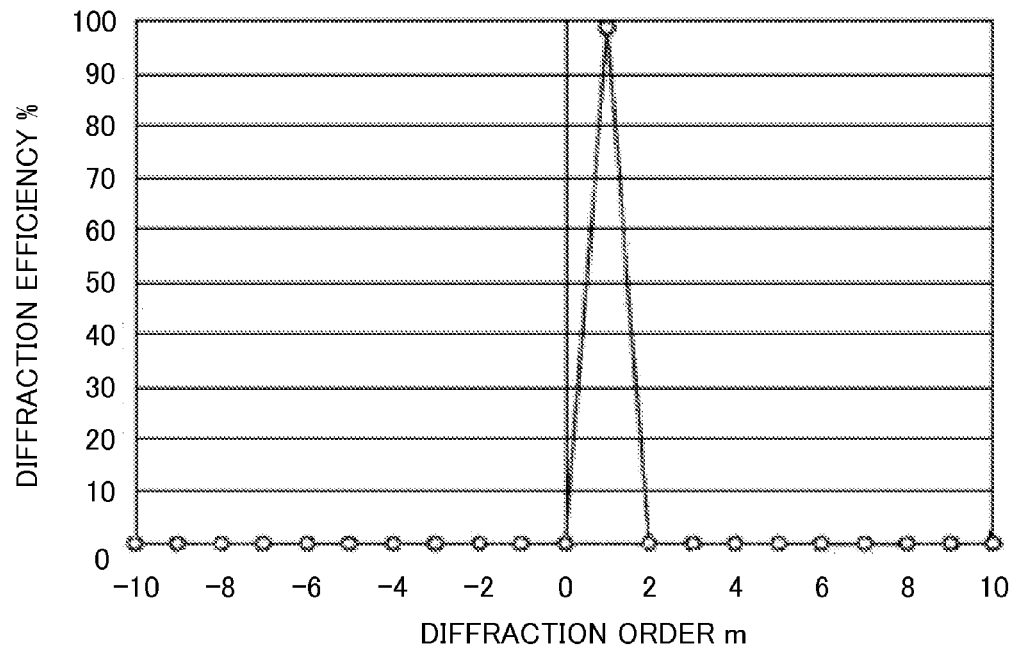
FIGS. 4A and 4B are graphs of diffraction efficiency with respect to designed incident luminous flux in a conventional diffractive optical element.
Figure 4B:
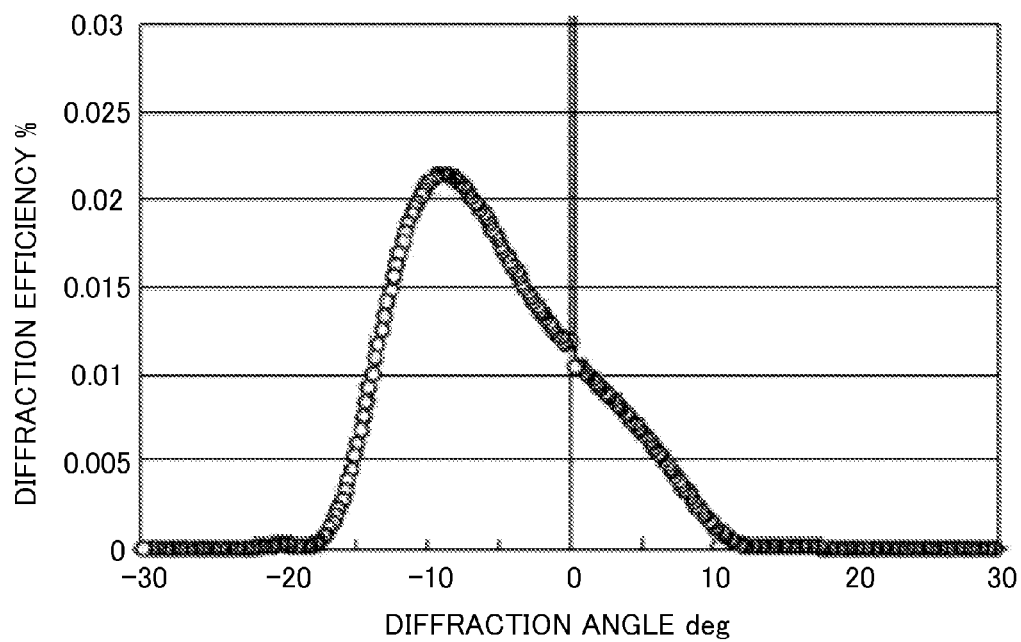
Figure 5:
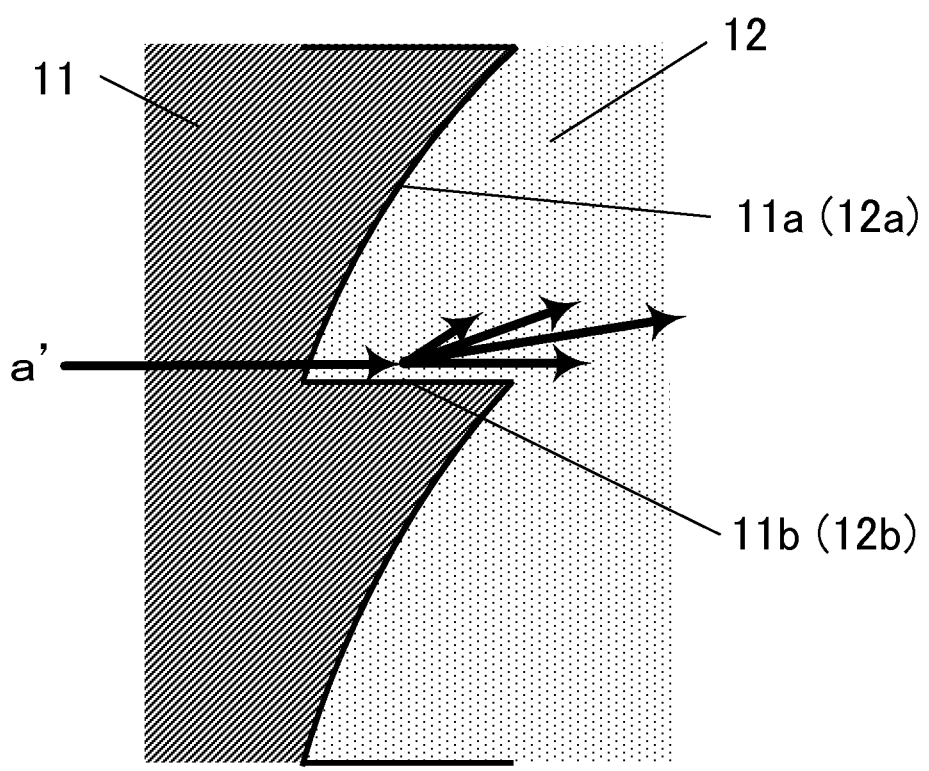
FIG. 5 is a schematic diagram illustrating propagation of unnecessary light with respect to designed incident luminous flux in a diffractive optical element.

FIGS. 4A and 4B illustrate an RCWA calculation result on conditions that the incident angle that is a designed incident angle of the diffraction grating part 10 is zero degree (light beam "a" in FIG. 3), the grating pitch is 100 μm, and the wavelength is 550 nm. FIG. 4A is diffraction efficiency in the vicinity of diffracted light of +1st order that is a designed order. A horizontal axis indicates a diffraction order, and a vertical axis indicates diffraction efficiency. FIG. 4B enlarges a lower part of the diffraction efficiency of the vertical axis and is a result of indicating a range of higher diffraction angles where the horizontal axis is changed from a diffraction order to a diffraction angle. The diffraction angle is defined so that a downward direction in FIG. 3 is a positive direction. According to FIG. 4A, the diffraction efficiency is concentrated on the +1st diffracted light that has a designed order, but the diffraction efficiency is 98.49% (the diffraction order is +1st order, and the diffraction angle is 0.21 degree) and is not 100%. The other light is unnecessary light, and propagates as unnecessary light having a peak in a specific angle direction as illustrated in FIG. 4B. The unnecessary light, as illustrated in FIG. 5, may be a diffraction phenomenon in which an incident component a' in the vicinity of the grating wall surface out of incident luminous flux rotationally moves to a side of a high refractive-index material in the grating wall surface. However, because it is unusual that a high brightness light source such as the sun in the daytime is directly imaged at the designed incident angle (imaging light incident angle), the unnecessary light is rarely influenced and as a result there is no problem.

Figure 6A:
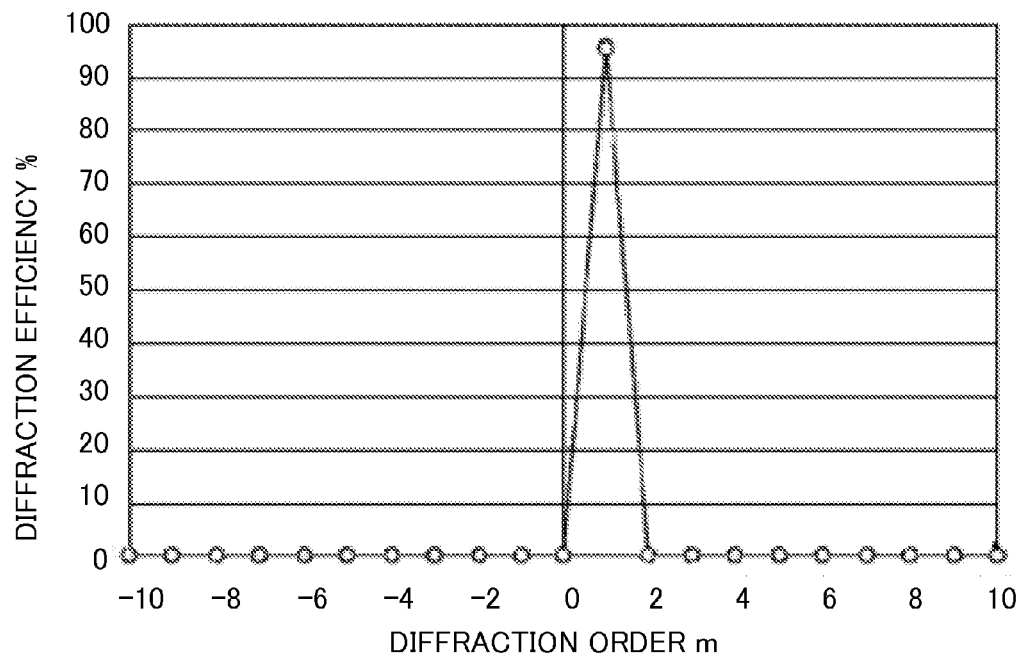
FIGS. 6A and 6B are graphs of diffraction efficiency with respect to off-screen incident luminous flux at an angle of +10 degrees in a conventional diffractive optical element.
Figure 6B:
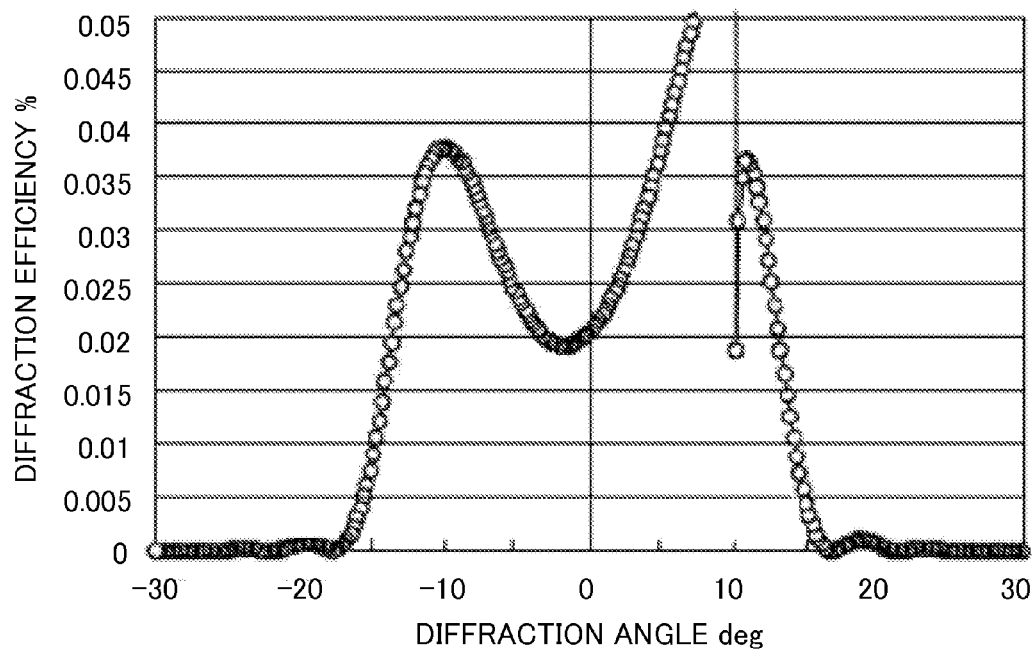
Figure 7:
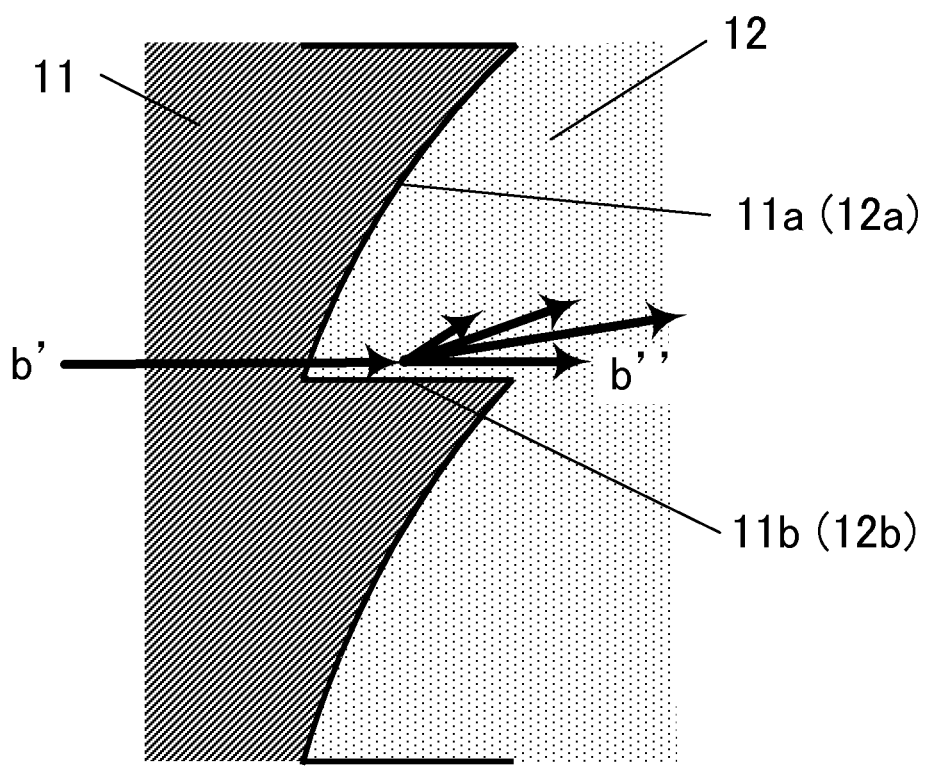
FIG. 7 is a schematic diagram illustrating propagation of unnecessary light with respect to off-screen incident luminous flux at an angle of +10 degrees in a diffractive optical element.

Next, considering luminous flux (light beam "b" in FIG. 3) which enters the diffraction grating part 10 in a downward direction at an obliquely incident angle (off-screen light incident angle) with reference to a designed incident angle, FIGS. 6A and 6B illustrate an RCWA calculation result on conditions that the incident angle is +10 degrees, the grating pitch is 100 μm, and the wavelength is 550 nm. The incident angle is defined so that a downward direction in FIG. 3 is a positive direction. FIG. 6A is diffraction efficiency in the vicinity of diffracted light of +1st order that is a designed order. A horizontal axis indicates a diffraction order, and a vertical axis indicates diffraction efficiency. FIG. 6B enlarges a lower part of the diffraction efficiency of the vertical axis and is a result of indicating a range of higher diffraction angles where the horizontal axis is changed from a diffraction order to a diffraction angle. The diffraction angle is defined so that a downward direction in FIG. 3 is a positive direction. According to FIG. 6A, the diffraction efficiency is concentrated on the diffracted light of +1st order that is a designed order, but the diffraction efficiency is 95.62% (the diffraction order is +1st order, and the diffraction angle is +9.94 degrees) and is decreased since the obliquely incident angle is tilted with reference to zero degree that is a designed incident angle. Since the +1st order diffracted light of the off-screen light incident angle does not reach the imaging plane, its influence is small. The other light, as illustrated in FIG. 6B, propagates as unnecessary light having a peak in a specific angle direction. The unnecessary light has a peak in a nearly −10 degrees direction, and its propagation direction is substantially equal to an emitting direction of −9.94 degrees in which a component of the luminous flux having the off-screen light incident angle of +9.94 degrees which enters the grating wall surface is totally reflected to be propagated after being diffracted as a +1st order light on the grating surface. Because the unnecessary light enters the grating wall surface from the side of a higher refractive-index material to the side of a lower refractive-index material at +80.6 degrees larger than a critical angle of 76.7 degrees, the total reflection is generated. The unnecessary light also extends over a high angle range from the peak in a nearly +10 degrees direction, and a component (light beam) b' of the incident luminous flux which enters the vicinity of the grating wall surface after being diffracted on the grating surface is totally reflected on the grating wall surface to be propagated in a −10 degrees direction. Furthermore, the unnecessary light is considered to extend in a total reflection emitting direction as a center to be propagated. The unnecessary light extends up to the vicinity of the diffraction angle of zero degree (light beam b" in FIG. 7). The diffraction angle of zero degree (light beam b" in FIG. 7) is substantially equal to a diffraction angle of 0.20 degree of the +1st order diffracted light (+1st order light in FIG. 2) based on a designed incident angle of zero degree (light beam a in FIG. 3). Therefore, it is indicated that the unnecessary light which emits at the vicinity of the diffraction angle of +0.20 degree out of the unnecessary light of the off-screen incident luminous flux at an angle of +10 degrees reaches the imaging plane. In accordance with the optical system arranged behind the diffractive optical element, the diffraction order and the diffraction angle of the unnecessary light of the off-screen incident luminous flux which reaches the imaging plane are different. However, even if any optical system is provided, diffracted light of the unnecessary light by the off-screen luminous flux which has substantially the same angle as a diffraction angle where at least designed diffraction order at the designed incident angle propagates reaches the imaging plane. Therefore, the image performance is deteriorated.

Figure 8A:
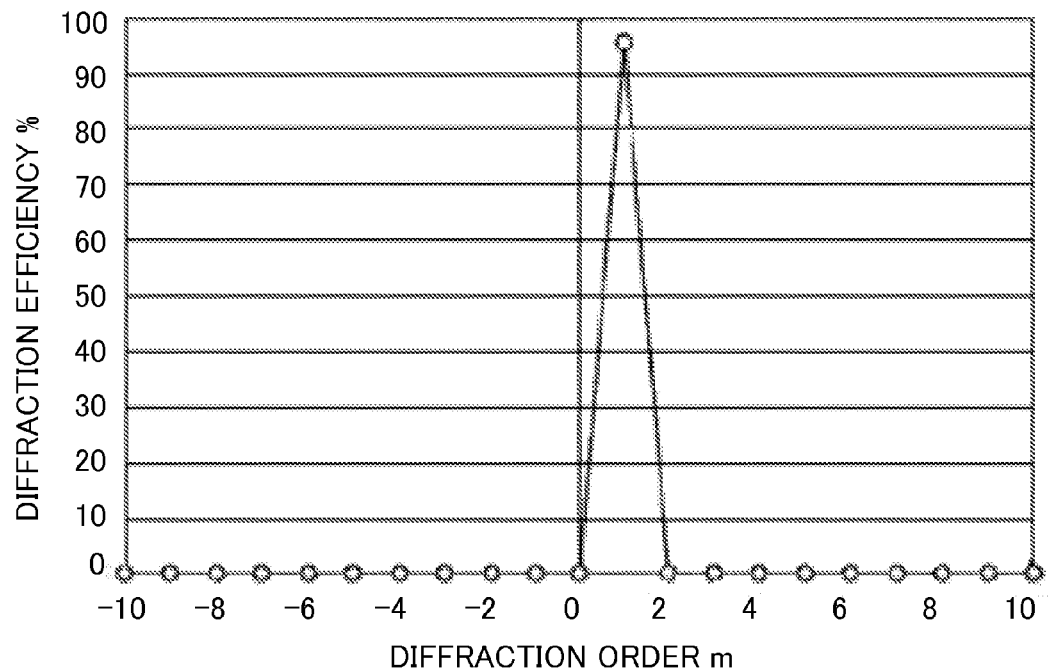
FIGS. 8A and 8B are graphs of diffraction efficiency with respect to off-screen incident luminous flux at an angle of −10 degrees in a conventional diffractive optical element.
Figure 8B:
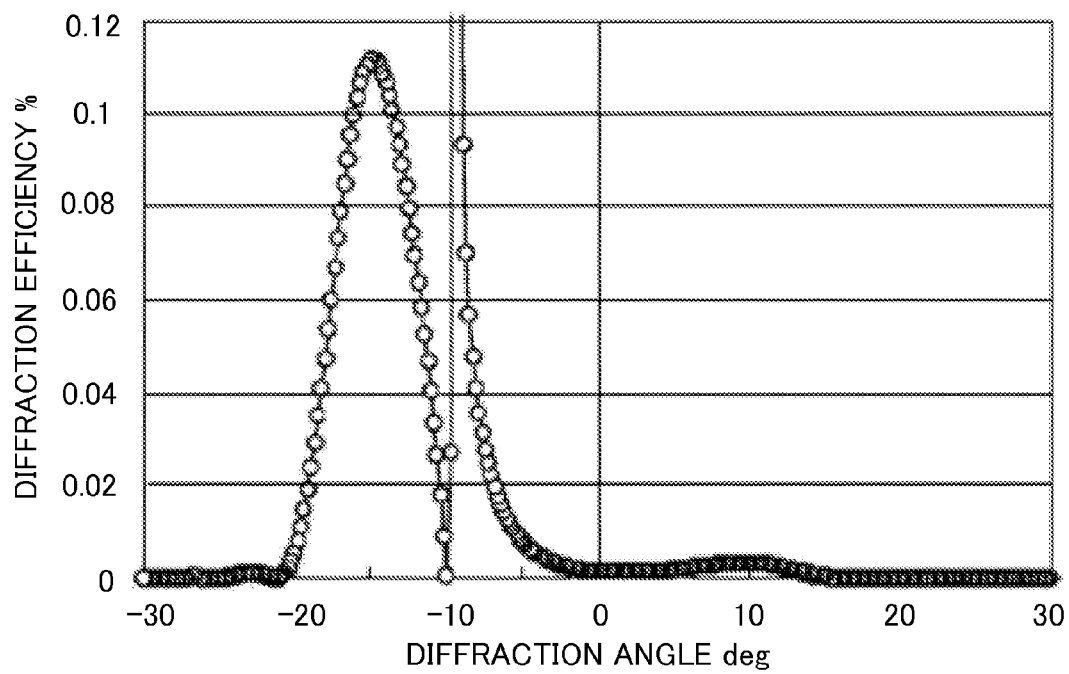
Figure 9:
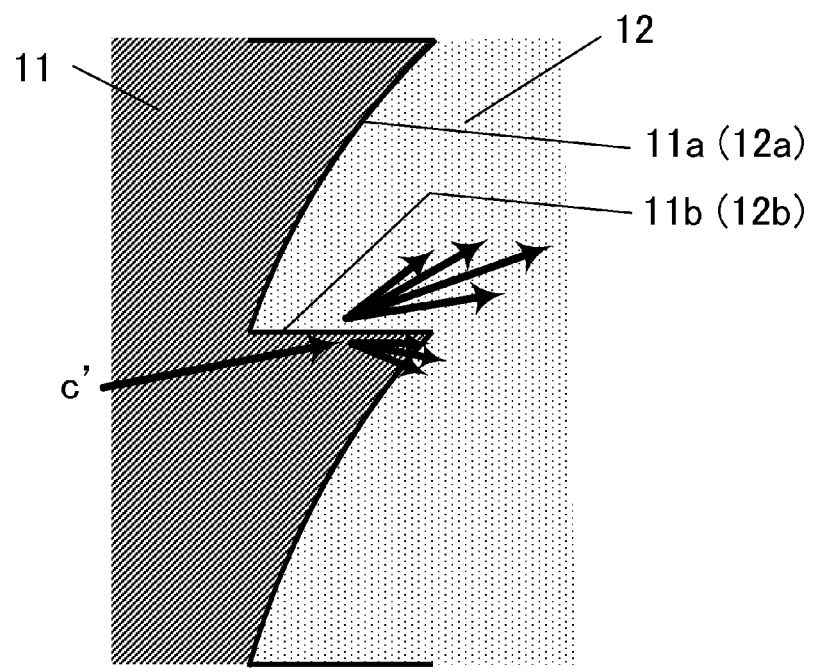
FIG. 9 is a schematic diagram illustrating propagation of unnecessary light with respect to off-screen incident luminous flux at an angle of −10 degrees in a diffractive optical element.

Next, considering luminous flux (light beam "c" in FIG. 3) which enters the diffraction grating part 10 in an upward direction at an obliquely incident angle (off-screen light incident angle) with reference to a designed incident angle, FIGS. 8A and 8B illustrate an RCWA calculation result on conditions that the incident angle is −10 degrees, the grating pitch is 100 μm, and the wavelength is 550 nm. The incident angle is defined so that a downward direction in FIG. 3 is a positive direction. FIG. 8A is diffraction efficiency in the vicinity of diffracted light of +1st order that is a designed order. A horizontal axis indicates a diffraction order, and a vertical axis indicates diffraction efficiency. FIG. 8B enlarges a lower part of the diffraction efficiency of the vertical axis and is a result of indicating a range of higher diffraction angles where the horizontal axis is changed from a diffraction order to a diffraction angle. The diffraction angle is defined so that a downward direction in FIG. 3 is a positive direction. According to FIG. 8A, the diffraction efficiency is concentrated on the +1st diffracted light that has a designed order, but the diffraction efficiency is 95.48% (the diffraction order is +1st order, and the diffraction angle is −9.52 degrees) and is decreased since the obliquely incident angle is tilted with reference to zero degree that is a designed incident angle. Since the +1st order diffracted light of the off-screen light incident angle does not reach the imaging plane, its influence is small. The other light, as illustrated in FIG. 8B, propagates as unnecessary light having a peak in a specific angle direction. The unnecessary light has a peak in a nearly −15 degrees direction. The unnecessary light also has a peak in a nearly +10 degrees direction. The propagation direction is substantially equal to an emitting direction of −16.6 degrees of the transmitted light of luminous flux having an off-screen incident angle of −10 degrees which enters the grating wall surface and an emitting direction of +9.5 degrees of reflected light. Because the unnecessary light enters the grating wall surface from the side of a lower refractive-index material to the side of a higher refractive-index material at +80 degrees, a transmittance of the transmitted light is 94% and the reflectance of the reflected light is 6%, which correspond to a situation where there are a large peak in a nearly −15 degrees direction and also a small peak in a nearly +10 degrees direction. The unnecessary light also extends over a higher angle range from the peak, and as illustrated in FIG. 9, a component (light beam) c' of the incident luminous flux which enters the vicinity of the grating wall surface propagates to be separated into the transmitted light and the reflected light on the grating wall surface. Furthermore, the unnecessary light is considered to extend around each peak as a center to be propagated. The unnecessary light does not extend up to the vicinity of the diffraction angle of zero degree and a numerical value of the diffraction efficiency is also extremely small. Therefore, it indicates that the influence by the unnecessary light of the off-screen incident luminous flux at an angle of −10 degrees reaching the imaging plane to deteriorate the image performance is small.

The transmitted light of the unnecessary light has a peak in the emitting direction of the transmitted light which is geometrically-optically calculated, and has a luminous flux region in which the transmitted light propagates at a wide emission angle. The reflected light of the unnecessary light has a peak in the emitting direction of the reflected light geometrically-optically calculated, and has a luminous flux region in which the reflected light propagates at a wide emission angle.

In the conventional method, the luminous flux entering the grating wall surface 11b is treated as a geometric optical phenomenon, and in that case, the luminous flux entering the grating wall surface 11b emits to propagate only in a specific direction in accordance with the Snell's law. However, the rigorous electromagnetic field calculation is performed with respect to the grating surface 11a (12a) and the grating wall surface 11b (12b) at the same time, the light entering and emitted from the grating wall surface 11b has substantially the same emitting direction in accordance with the Snell's law. However, it does not follow the Snell's law perfectly, and the emitted light is widely emitted. Therefore, the conventional method is not sufficient to suppress the unnecessary light and the unnecessary light that should be suppressed is not considered. Furthermore, when the diffraction grating part is actually made, it is confirmed that the unnecessary light widely propagates as indicated by the RCWA calculation result.

In the embodiment, the diffraction efficiency on condition that the grating pitch is 100 μm is described. Because the contribution of the grating wall surface is smaller in zones having a wider grating pitch, the diffraction efficiency of the designed order is higher and the diffraction efficiency of the unnecessary light is lower. It is confirmed that the propagating direction of the unnecessary light does not depend on the grating pitch (not illustrated in the drawings). Therefore, as one reference, the diffraction efficiency on condition that the grating pitch is 100 μm is described. This is also true for the following embodiments.

Figure 10:
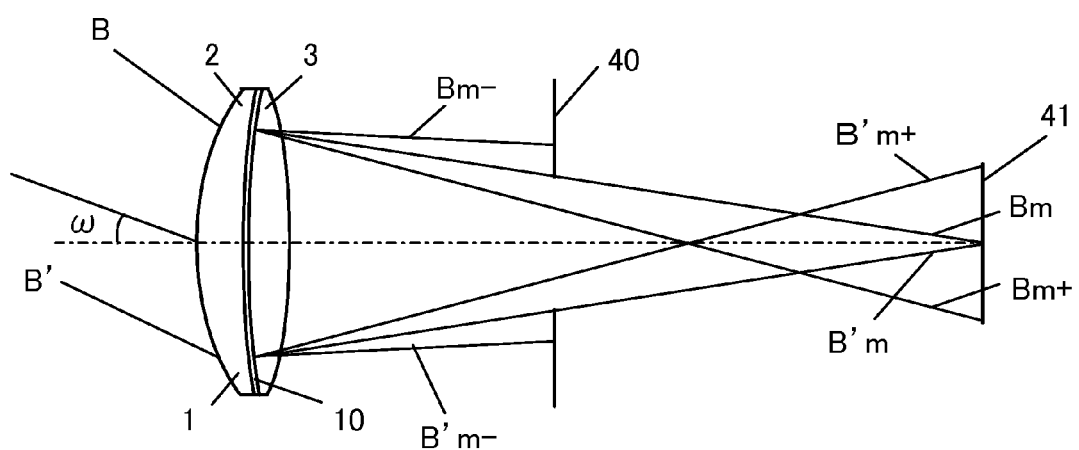
FIG. 10 is a conceptual diagram of a ray of unnecessary light in an optical system having a diffractive optical element.
Figure 11:
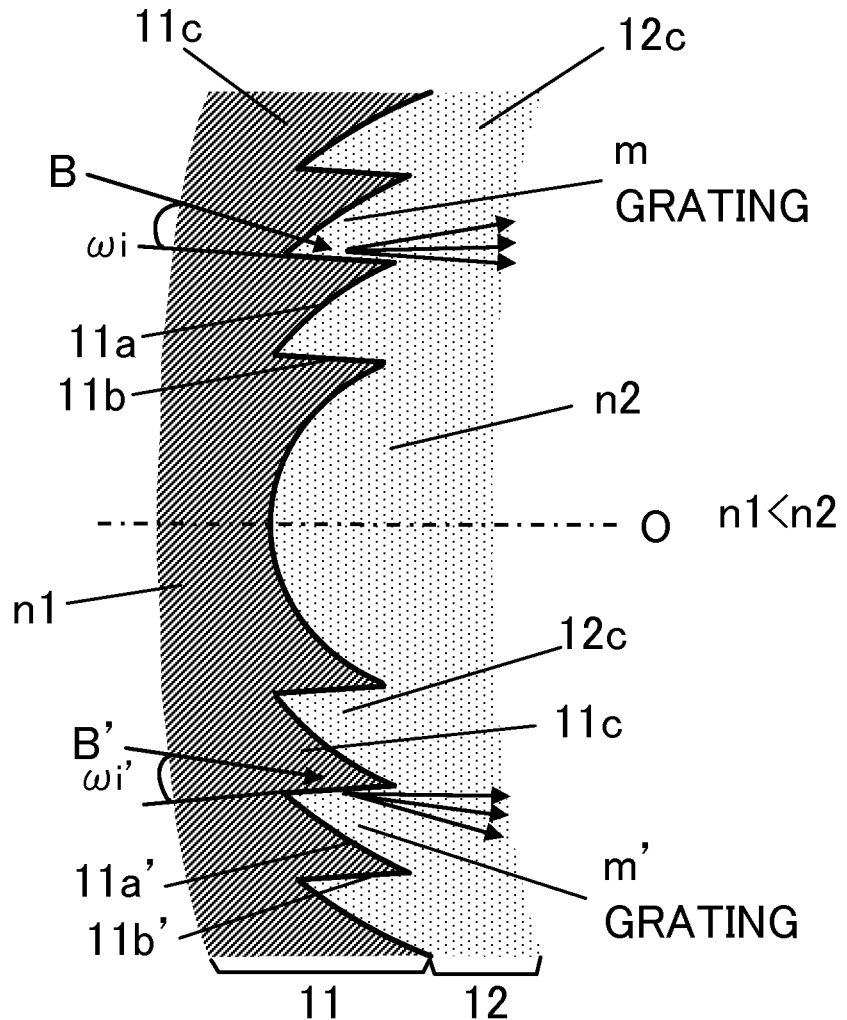
FIG. 11 is a schematic diagram illustrating a relationship between an element structure of a diffractive optical element and off-screen incident luminous flux.
Figure 24:
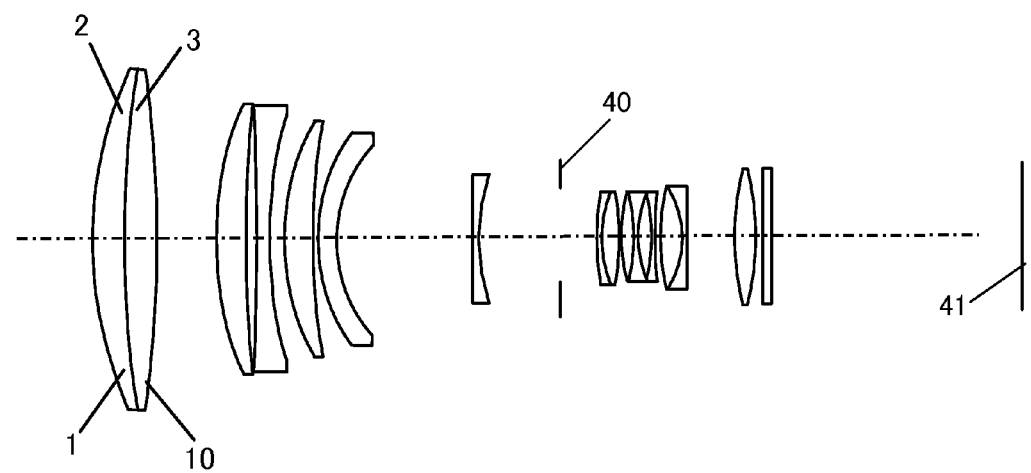
FIG. 24 is a main cross-sectional diagram of an optical system having a diffractive optical element.

Next, unnecessary light generated when off-screen light enters the above diffractive optical element applied to an actual optical system will be described. FIG. 24 is an image pickup optical system of a telephoto type using the diffractive optical element, where f=392.00 mm, fno=4.12, half angle of field is 3.16 degrees, and a diffraction surface is provided on a second surface. FIG. 10 illustrates a schematic view of the unnecessary light of the diffractive optical element in the optical system of FIG. 24, and FIG. 11 illustrates an enlarged view of a cross-sectional shape obtained by cutting the diffractive optical element 1. For easy understanding of the grating shape, FIG. 11 is rather deformed in a grating depth direction. In addition, it is depicted so that the number of the grating is reduced as compared with the actual number. In FIGS. 10 and 11, off-screen luminous fluxes B and B' which enter the diffractive optical element at an incident angle ω with respect to an optical axis O pass through the substrate 2 of the first diffractive optical element 11. Then, they enter m and m' gratings (the grating parts) that are located at m-th position counted from the optical axis O in an upward direction and in a downward direction in the drawing, respectively. The incident angles with respect to the m and m' gratings of the off-screen luminous fluxes B and B' are angles ωi and ωi' with respect to a principal ray direction. Directions of grating wall surfaces 1b and 1b' are equal to the principal ray direction.

In the embodiment, it is assumed that the incident angle ω of the off-screen luminous fluxes B and B' is nearly +10 degrees (the incident angle ω is +13.16 degrees with respect to an optical axis direction). At an angle smaller than the incident angle, the unnecessary light of the diffractive optical element is not comparatively unnoticed since influences of ghosts caused by a lens surface or an imaging surface reflection or scattering generated inside the lens or micro asperity of a surface are high. On the other hand, at an angle larger than the incident angle, the influence of the unnecessary light on the diffractive optical element 1 is comparatively small because the off-screen luminous flux does not easily enter the diffractive optical element 1 by the reflection on the lens surface or a lens barrel arranged at a front side. Therefore, the incident angle ω near +10 degrees is the most influential on the unnecessary light of the diffractive optical element 1, and in the embodiment the incident angle ω of the off-screen luminous flux is assumed to be nearly +10 degrees.

The m grating has a grating shape in which a grating height of the grating part 11c of the diffraction grating 11 increases (a grating height of the grating part 12c of the diffraction grating 12 decreases) from bottom to top in the drawing, and the off-screen incident luminous flux B is luminous flux which enters the diffractive optical element in a downward direction. The incident angle ωi with respect to the grating part 11c is +10 degrees. The relationship between the m grating and the off-screen incident luminous flux B corresponds to the relationship between FIGS. 6 and 7. Therefore, the unnecessary light widely propagates in a total reflection emitting direction as a center on the grating wall surface 11b. The unnecessary light extends up to the vicinity of a diffraction angle of +0.21 degree that is nearly equal to the diffraction angle of the +1st diffracted light of the designed incident angle of zero degree as illustrated in FIG. 6. Therefore, it is shown that the unnecessary light (light beam Bm in FIG. 10) emitted to the vicinity of the diffraction angle of +0.21 degree reaches the imaging surface 41. The diffraction efficiencies at the vicinity of the diffraction angle of zero degree are, based on the RCWA calculation result, 0.021% in the diffraction order of −45 (the diffraction angle of +0.38 degree) and 0.021% in the diffraction order of −46 (the diffraction angle of 0.17 degree). The numerical values of the diffraction efficiencies are low values, but the influence cannot be ignored if there is a high brightness light source such as the sun in the daytime outside the screen at the time of forming an image. The unnecessary light (Bm− in FIG. 10, a peak of the unnecessary light), out of the unnecessary light of the off-screen incident luminous flux at an angle of +10 degrees, emitted at an angle smaller than the diffraction angle of zero degree is shielded by a stop 40 and does not reach the imaging surface 41. The diffraction orders and the diffraction angles (the relationship of Bm− to Bm+ through Bm in FIG. 10) where the unnecessary light of the off-screen incident luminous flux reaches the imaging surface are different in accordance with the optical system behind the diffractive optical element or a position of the stop. However, even if any optical system is provided, diffracted light (Bm in FIG. 10) of the unnecessary light by the off-screen luminous flux which has substantially the same angle as a diffraction angle where at least designed diffraction order at the designed incident angle propagates reaches the imaging plane. Therefore, the image performance is deteriorated.

The m' grating has a grating shape in which a grating height of the diffraction grating 11 decreases (a grating height of the diffraction grating 12 increases) from bottom to top in the drawing, and the off-screen incident luminous flux B' is luminous flux which enters the diffractive optical element in a downward direction. The incident angle ωi' with respect to the grating part is 10 degrees. The relationship between the m' grating and the off-screen incident luminous flux B' corresponds to the relationship between FIGS. 8 and 9 since it is the case that top and bottom of FIGS. 8 and 9 are reversed. Therefore, the unnecessary light widely propagates in a transmitted light emitting direction as a center and in a reflection emitting direction as a center on the grating wall surface 11b, and the unnecessary light in the transmitted light emitting direction is significantly great. The unnecessary light does not extend up to the vicinity of a diffraction angle of zero degree that is nearly equal to the diffraction angle of the +1st diffracted light of the designed incident angle of zero degree as illustrated in FIG. 8. Therefore, the unnecessary light (light beam B'm in FIG. 10), out of the unnecessary light having the incident angle of 10 degrees, emitted to the vicinity of the diffraction angle of zero degree reaches the imaging surface 41, but the numerical value of the diffraction efficiency is extremely small. With regard to more specific numerical value, based on the RCWA calculation result, the diffraction efficiency in the diffraction order of +48 (the diffraction angle of +0.24 degree) is 0.0015%, and the diffraction efficiency in the diffraction order of +47 (the diffraction angle of +0.03 degree) is 0.0015%. The numerical values of the diffraction efficiencies are not influenced so much if there is a high brightness light source such as the sun in the daytime. The unnecessary light (B'm− in FIG. 10, the +1st diffracted light and the peak of the unnecessary light), out of the unnecessary light of the off-screen incident luminous flux having an incident angle of −10 degrees, emitted at an angle smaller than the diffraction angle of zero degree is shielded by the stop 40 and does not reach the imaging surface 41. On the other hand, the unnecessary light (B'm+ in FIG. 10) that is emitted at an angle larger than the diffraction angle of zero degree and that reaches the maximum image height position of the imaging surface 41, out of the unnecessary light of the off-screen incident luminous flux at an angle of +10 degrees, reaches the imaging surface 41. The diffraction orders and the diffraction angles (the relationship of B'm− to B'm+ through B'm in FIG. 10) where the unnecessary light of the off-screen incident luminous flux reaches the imaging surface 41 are different in accordance with the optical system at a rear side (an image side) of the diffractive optical element 1 or a position of the stop 40. However, even if any optical system is provided, diffracted light (light beam B'm in FIG. 10) of the unnecessary light by the off-screen luminous flux which has substantially the same angle as a diffraction angle where at least designed diffraction order at the designed incident angle propagates reaches the imaging plane. The unnecessary light (light beam B'm in FIG. 10) emitted to the vicinity of the diffraction angle of zero degree is not extended so much. Therefore, the value of the diffraction efficiency is extremely small and the influence is small.

As described above, in the optical system to which the diffractive optical element 1 is applied, when the off-screen incident luminous flux enters the diffractive optical element at an incident angle of nearly 10 degrees, the unnecessary light which emits the vicinity of the diffraction angle of zero degree by the m grating is greater, and the unnecessary light which emits the vicinity of the diffraction angle of zero degree by the m' grating is smaller, as illustrated in FIGS. 10 and 11. Therefore, the contribution of the m grating is great with respect to the deterioration of the image performance. When the diffractive optical element 1 and the optical system are actually made to taking an image, it is confirmed that the unnecessary light reaches the imaging plane and that the image performance is deteriorated.

In the conventional method, the luminous flux entering the grating wall surface is treated as a geometric optical phenomenon, and in that case, the luminous flux entering the grating wall surface emits to propagate only in a specific direction in accordance with the Snell's law. As illustrated in FIGS. 10 and 11, when the diffractive optical element 1 is applied to the optical system and the off-screen luminous flux enters the diffractive optical element at an angle of an incident angle of nearly 10 degrees, the total reflection occurs at the m grating, and the transmitted light of 94% and the reflected light of 6% are generated at the m' grating. In both cases, the light does not reach the imaging surface 41 because it is shielded by the stop 40. As above, the conventional method is not sufficient to suppress the unnecessary light and the unnecessary light that is to be suppressed is not sufficiently considered.

Embodiment 1

Subsequently, the element configuration of the diffractive optical element and the unnecessary light in the present invention will be described. FIG. 1 is a front view and a side view of the diffractive optical element in Embodiment 1 of the present invention. The diffractive optical element 1 is formed by providing a diffraction grating part 10 constituted of a plurality of diffraction gratings in a space formed between substrates 2 and 3 which are made of a plane plate or a lens (having a lens function). In the present embodiment, surfaces of the substrates 2 and 3 on which the diffraction grating part 10 is formed have curved surface shapes. The diffraction grating part 10 is constituted of a diffraction grating which is made of a plurality of concentric grating parts with reference to an optical axis O as a center, and has a lens function.

FIG. 2 is an enlarged diagram of a part of a cross-sectional shape obtained by cutting the diffractive optical element 1 of FIG. 1 at A-A' cross section in the drawing. In order to easily understand the grating shape of the grating parts 11c and 12c of the first and second diffraction gratings 11 and 12, FIG. 2 is rather deformed in a grating depth direction. In addition, it is depicted that the number of the gratings is reduced as compared with that of actual gratings. In FIGS. 1 and 2, the diffraction grating part 10 of the diffractive optical element 1 is configured so that the first diffraction grating 11 and the second diffraction grating 12 contact with or adhere tightly to each other. The diffraction gratings 11 and 12 include grating parts 11c and 12c having blazed structures of concentric shapes constituted of the grating surfaces 11a and 12a and the grating wall surfaces 11b and 12b, respectively.

The grating pitches of the grating parts 11c and 12c are gradually changed from the optical axis (center region) O to the outer circumferential part (peripheral region) to have a lens function (a converging effect or a diverging effect of light). Furthermore, The grating surfaces 11a and 12a and the grating wall surfaces 11b and 12b of the diffraction gratings 11 and 12 contact with (adhere to) each other without any gap, and the first and second diffraction gratings 11 and 12 function as one diffraction grating part 10 in their entirety. In addition, since the diffraction gratings have the blazed structures, the incident light entering the diffractive optical element 1 is diffracted concentrating in a specific diffraction order (1st order in the drawing) with respect to a direction of zero-order diffraction where the incident light is not diffracted and transmits through the diffraction grating part 10.

For easy descriptions, as illustrated in FIG. 3, surfaces 2a and 3a on which the diffraction grating part 10 disposed between the substrates 2 and 3 is formed are plane surfaces. In this case, envelope surfaces 11d and 12d which are obtained by jointing grating end parts of the grating parts of the diffraction grating part 10 are plane surfaces vertical to the optical axis O. Furthermore, all surface normals of the envelope surface at the intersections with the above grating end part are directed in parallel to the optical axis O. A used wavelength range of the diffractive optical element in the present embodiment is a visible range containing a range from a g-line to a C-line (wavelength of 400 nm to 700 nm). Therefore, the material constituting the first diffraction grating 11 and the second diffraction grating 12 and the grating height are selected so that the diffraction efficiency of the diffracted light of the designed order (specific order) in the entire visible range is improved. In other words, the material of each diffraction grating and the grating height are determined so that the maximum optical path length difference of the light passing through the plurality of diffraction gratings (the diffraction gratings 11 and 12), i.e. the maximum value of the optical path length difference between a peak and a valley of the diffraction part, is around an integral multiple of the wavelength in the used wavelength range. Thus, the materials and the shapes of the diffraction gratings 11 and 12 are appropriately set to obtain high diffraction efficiency in the entire used wavelength range.

Subsequently, the configuration of the diffraction grating part 10 of the diffractive optical element in the present invention and the unnecessary light will be described. With regard to a specific configuration of the diffraction grating part 10, the first diffraction grating 11 is formed by a grating forming material of an ultraviolet curable resin mixed with fine particles of nd=1.481, vd=20.7, θgF=0.404, and n550=1.483. The second diffraction grating 12 is formed by a grating forming material using an ultraviolet curable resin of nd=1.524, vd=51.6, θgF=0.539, and n550=1.524.

The grating height d of the grating part is preferably equal to or greater than 6 μm, and is 27.02 μm in the present embodiment. The designed order is preferably equal to or greater than 2, and is +2nd order in the present embodiment. As compared with a case where the designed order is +1st order, a phase function is ½ (1/m), the grating pitch is twice (m times), and the grating height is twice (m times) in the case where the designed order is +2nd order. Thus, the emitting angle of the +2nd diffracted light having the designed order of +2nd order is equal to the emitting angle of the +1st diffracted light having the designed order of +1st order, and the optical characteristics of the designed orders of the diffraction grating parts are the same. In addition, the number of the gratings (the number of zones) is ½ (1/m). In the embodiment, the phase function φm(r) of the diffraction grating in a designed order of m as a phase transformation function of the wave front by the diffraction grating is represented as follows.

$$\phi m(r) = \{\phi 1(m)\}/m$$

Figure 12A:
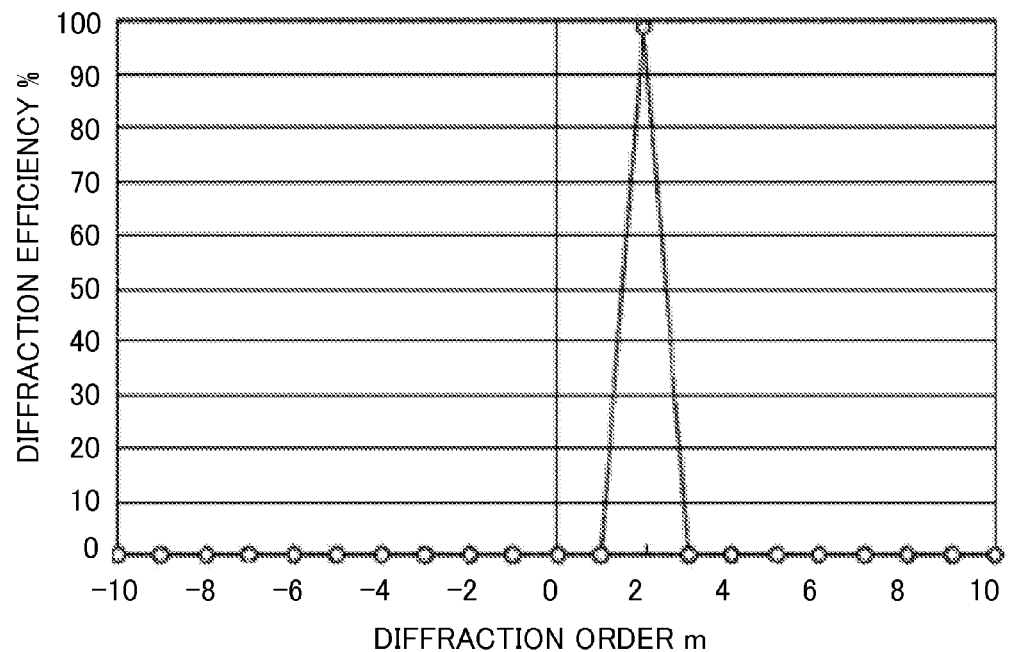
FIGS. 12A and 12B are graphs of diffraction efficiency with respect to designed incident luminous flux in a diffractive optical element of Embodiment 1.
Figure 12B:
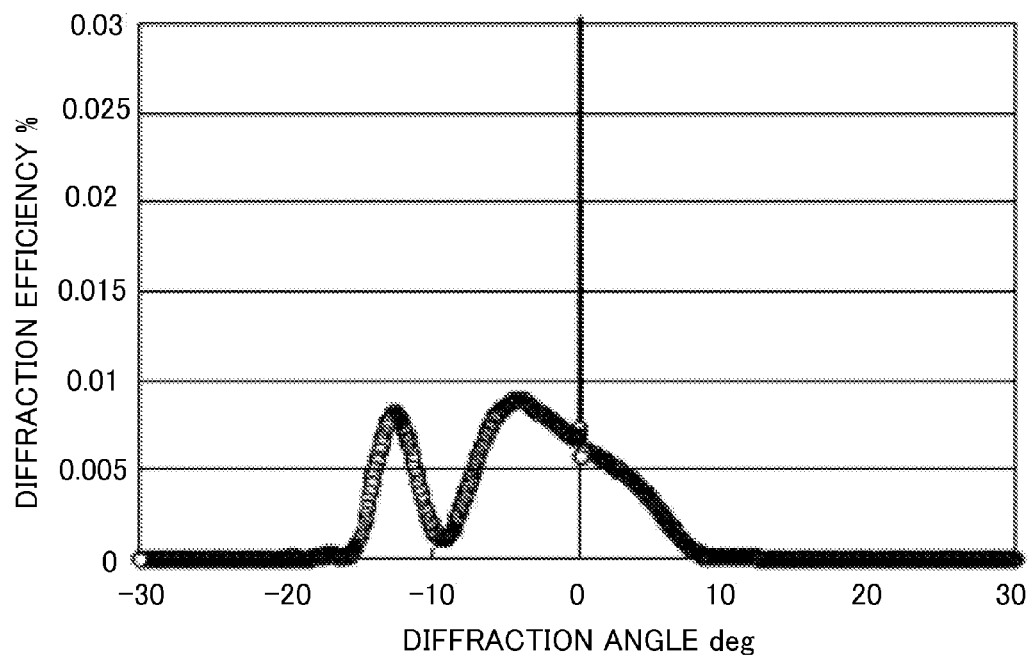

FIGS. 12A and 12B illustrate results of the RCWA calculation on conditions that the designed incident angle of the diffraction grating part is an incident angle of zero degree (light beam "a" in FIG. 3), the grating pitch is 200 μm, and the wavelength is 550 nm. FIG. 12A illustrates diffraction efficiency in the vicinity of the diffracted light of +2nd order that is the designed order. The horizontal axis is a diffraction order, and the vertical axis is the diffraction efficiency. FIG. 12B enlarges a lower part of the diffraction efficiency of the vertical axis in FIG. 12A and is a result of indicating a range of higher diffraction angles where the horizontal axis is changed from a diffraction order to a diffraction angle. The diffraction angle is defined so that a downward direction in FIG. 3 is a positive direction. According to FIG. 12A, the diffraction efficiency of the +2nd diffracted light that is the designed order is 98.85% (the diffraction angle is +0.21 degree), which is equal or more than the diffraction efficiency of the +1st diffracted light that is the designed order of 98.49% (the diffraction angle of +0.21 degree). The other light is unnecessary light which propagates with a peak in a specific angle direction as illustrated in FIG. 12B. The behavior of the unnecessary light having the designed order of +1st order is different from that having the designed order of +2nd order.

Similarly to FIG. 5, the unnecessary light may be generated since the component a' entering the vicinity of the grating wall surface of the incident luminous flux is rotationally moved so as to be reflected to the side of the higher refractive-index material on the grating wall surface and the emitting angle is shifted to the side of the large angle as compared with that of the +1st designed order. A −10 degrees direction is a so-called shadow and may be a region where the unnecessary light does not propagate. Thus, the behaviors of the unnecessary lights are different between the +1st and +2nd orders. It is assumed that the grating pitch is 200 μm (100 μm in the designed order of +1st order) as one reference. As illustrated in FIG. 1, because the grating pitch is larger and the bad influence by the grating wall surface is reduced as the zones are close to the optical axis, the diffraction efficiency of the designed order is higher and the diffraction efficiency of the unnecessary light is lower. In the present embodiment, considering the entire region of the diffractive optical element, the difference of the diffraction efficiencies of the grating pitch 200 μm (100 μm in the designed order of the 1st order) is rarely influenced and as a result there is no problem because it is unusual that a high brightness light source such as the sun in the daytime is directly imaged at the designed incident angle (imaging light incident angle).

Next, the unnecessary light generated when off-screen light enters the above diffractive optical element applied to an actual optical system will be described. FIG. 24 is an image pickup optical system of a telephoto type using the diffractive optical element, where f=392.00 mm, fno=4.12, half angle of field is 3.16 degrees, and a diffraction surface is provided on a second surface. FIG. 10 illustrates a schematic view of the unnecessary light of the diffractive optical element in the optical system of FIG. 24, and FIG. 11 illustrates an enlarged view of a cross-sectional shape obtained by cutting the diffractive optical element 1. In FIGS. 10 and 11, off-screen luminous fluxes B and B' which enter the diffractive optical element at an incident angle ω with respect to an optical axis O pass through the substrate 2 of the first diffractive optical element 11. Then, they enter m and m' gratings (the grating parts) that are located at m-th position counted from the optical axis O in an upward direction and in a downward direction in the drawing, respectively. The incident angles with respect to the m and m' gratings of the off-screen luminous fluxes B and B' are angles ωi and ωi' with respect to a principal ray direction. Directions of grating wall surfaces 1b and 1b' are equal to the principal ray direction.

Figure 13A:
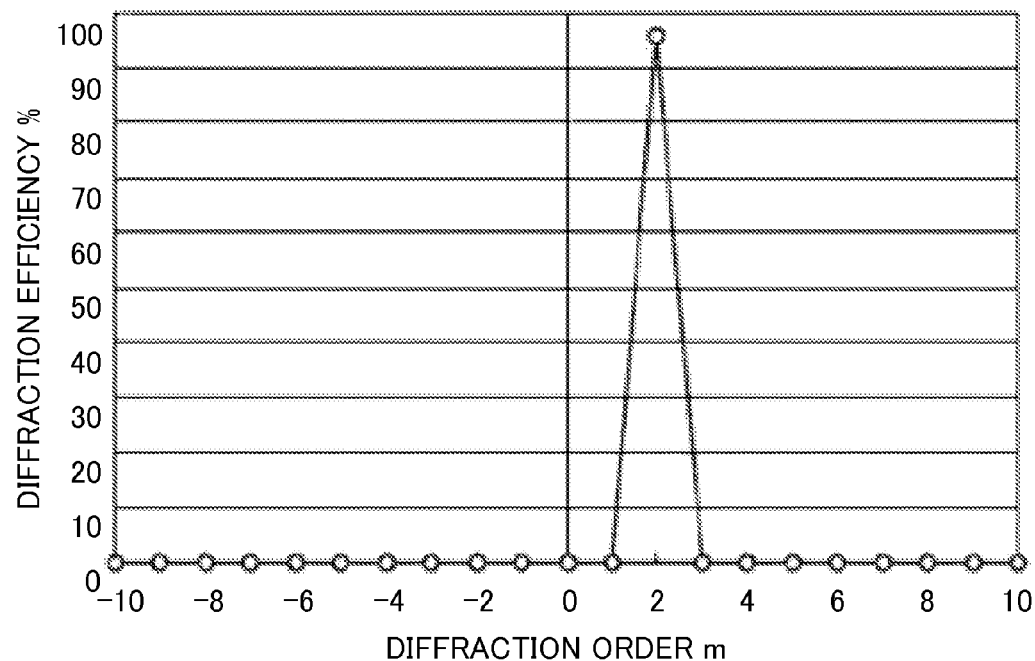
FIGS. 13A and 13B are graphs of diffraction efficiency with respect to off-screen incident luminous flux at an angle of +10 degrees in a diffractive optical element of Embodiment 1.
Figure 13B:
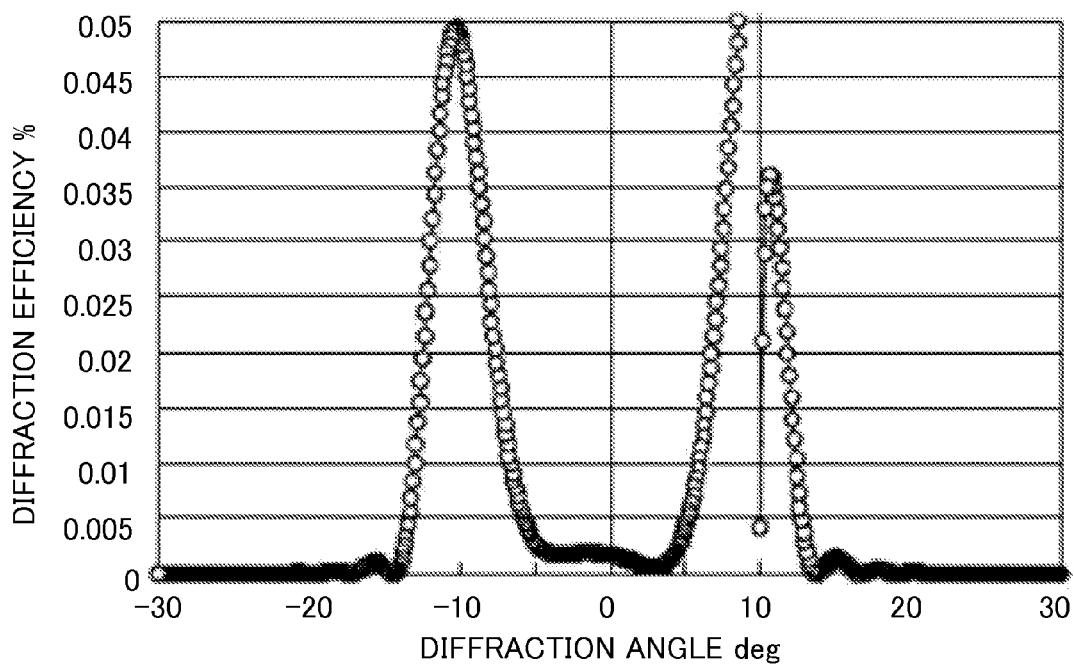

Considering luminous flux (light beam b in FIG. 3, and light beam B in FIG. 11) which enters the diffraction grating part in an downward direction at an obliquely incident angle (off-screen light incident angle) with reference to a designed incident angle, FIGS. 13A and 13B illustrate an RCWA calculation result on conditions that the incident angle is +10 degrees, the grating pitch is 200 μm, and the wavelength is 550 nm. The incident angle is defined so that a downward direction in FIG. 3 is a positive direction. FIG. 13A is diffraction efficiency in the vicinity of diffracted light of +2nd order that is a designed order. A horizontal axis indicates a diffraction order, and a vertical axis indicates diffraction efficiency. FIG. 13B enlarges a lower part of the diffraction efficiency of the vertical axis and is a result of indicating a range of higher diffraction angles where the horizontal axis is changed from a diffraction order to a diffraction angle. The diffraction angle is defined so that a downward direction in FIG. 3 is a positive direction. According to FIG. 13A, the diffraction efficiency is concentrated on the +2nd diffracted light that has a designed order, but the diffraction efficiency is 95.41% (the diffraction order is +2nd order, and the diffraction angle is +9.94 degrees) and is decreased since the obliquely incident angle is tilted with reference to zero degree that is a designed incident angle.

Since the +2nd order diffracted light of the off-screen luminous flux does not reach the imaging plane, its influence is small. The other light, as illustrated in FIG. 13B, propagates as unnecessary light having a peak in a specific angle direction. The unnecessary light has a peak in a nearly −10 degrees direction, and its propagation direction is nearly equal to an emitting direction of −9.94 degrees in which a component of the incident angle of +9.94 degrees of the off-screen luminous flux which enters the grating wall surface is totally reflected to be propagated after being diffracted as a +2nd order light on the grating surface. Because the unnecessary light enters the grating wall surface from the side of a higher refractive-index material to the side of a lower refractive-index material at +80.6 degrees larger than a critical angle of 76.7 degrees, the total reflection is generated. The peak angle of the unnecessary light in the −10 degrees direction is substantially the same as that of FIG. 6B, but the angle spreads of the unnecessary lights are different between FIGS. 13B and 6B, and FIG. 13B illustrates a sharper peak and the unnecessary light is concentrated on the peak. In other words, the behaviors of the unnecessary lights are different between the +1st and +2nd designed orders, and it means that +2nd designed order is closer to the phenomenon of the geometric optics.

As illustrated in FIGS. 24, 10, and 11, the diffracted light of the unnecessary light generated by the off-screen luminous flux having a diffraction angle nearly equal to +0.21 degree where the designed diffraction order at the designed incident angle propagates out of the unnecessary light generated when the off-screen luminous flux enters the diffractive optical element applied to the actual optical system reaches the imaging plane. Thus, according to the RCWA calculation result, the diffraction efficiencies at the vicinity of the diffraction angle of +0.21 degree in FIG. 13B are 0.0017% in a diffraction order of −91 (at a diffraction angle of +0.27 degree) and 0.0017% in a diffraction order of −92 (at a diffraction angle of +0.17 degree). Since the diffraction efficiencies in the designed order of +1st order are 0.021% in a diffraction order of −45 (at a diffraction angle of +0.38 degree) and 0.021% in a diffraction order of −46 (at a diffraction angle of +0.17 degree), the diffraction efficiencies in the designed order of +2nd order are significantly decreased as compared with those in the designed order of +1st order.

Figure 15A:
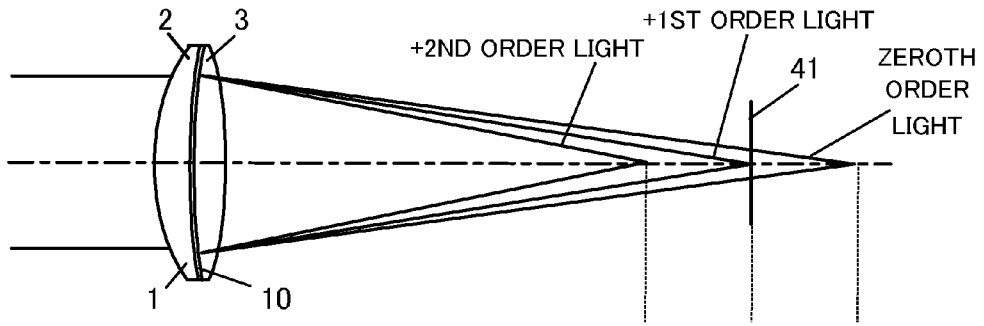
FIGS. 15A and 15B are conceptual diagrams of rays in a diffractive optical element when a designed order is +1st order and +2nd order, respectively.
Figure 15B:
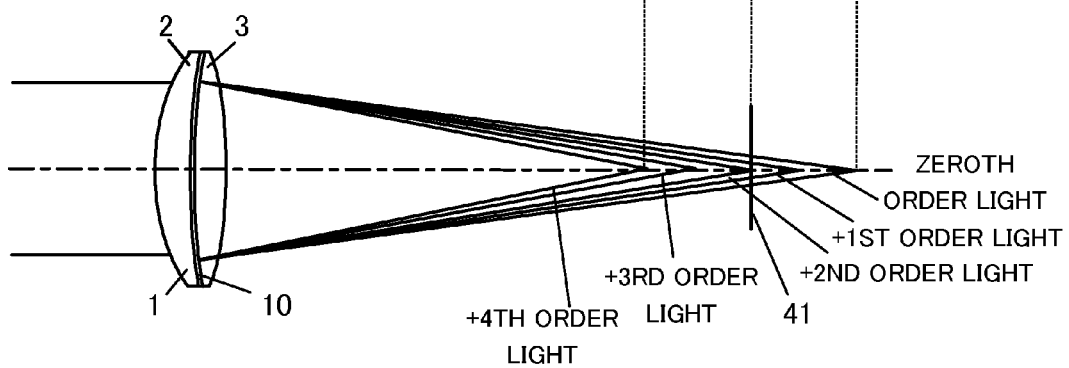

When the designed order is +2nd order, as compared with the designed order of +1st order, the difference of the diffraction angles of the diffracted lights of adjacent orders is ½. As a simple example, FIGS. 15A and 15B illustrate imaging positions of diffracted lights around +1st order with respect to the luminous flux entering the diffraction grating at the designed incident angle of zero degree when the designed order is +1st order and +2nd order. As illustrated in FIG. 15A, when the designed order is +1st order, the +1st order diffracted light is imaged on the imaging plane 41. Furthermore, as illustrated in FIG. 15B, when the designed order is +2nd order, the +2nd order diffracted light is imaged on the imaging plane 41. As illustrated in FIG. 15A, when the designed order is +1st order, zeroth order diffracted light is imaged behind the imaging plane 41, and the 2nd order diffracted light is imaged in front of the imaging plane 41. As illustrated in FIG. 15B, when the designed order is +2nd order, the +1st order and zeroth order diffracted lights are imaged behind the imaging plane 41. In this case, the imaging position of the zeroth order diffracted light is equal to that of the zeroth order diffracted light in the designed order of 1st order, and the imaging position of the +1st order diffracted light is imaged between positions of the +2nd order and the zeroth order. The +3rd order and +4th order lights in the designed order of the +2nd order are imaged in front of the imaging plane 41, but the imaging position of the +4th diffracted light is equal to that of the +2nd order diffracted light in the designed order of +1st order and the imaging position of the +3rd diffracted light is imaged at a position between positions of the +2nd order and the +4th order.

The relation is similar to a case where the off-screen luminous flux enters the diffractive optical element, and the number of the unnecessary lights reaching the imaging plane in the designed order of +2nd order is twice as large as that in the designed order of +1st order. Therefore, the diffraction efficiency at the vicinity of the diffraction angle of +0.21 degree in the designed order of +2nd order is converted into 0.0034 that has been doubled, but compared with the diffraction efficiency of 0.021% in the designed order of +1st order, it is significantly decreased.

Figure 14A:
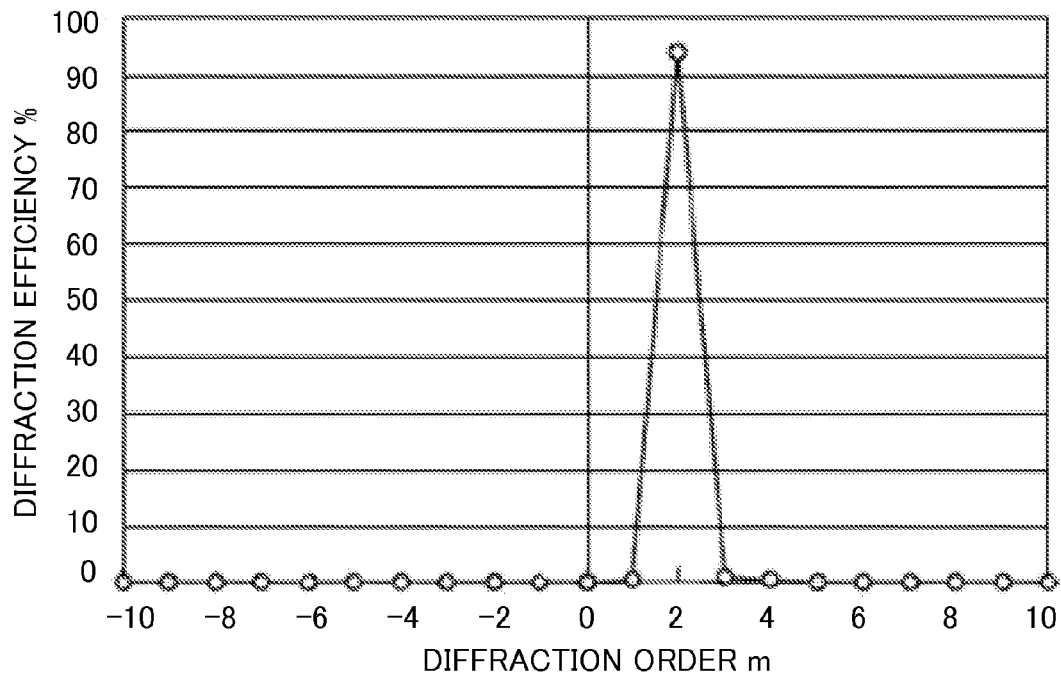
FIGS. 14A and 14B are graphs of diffraction efficiency with respect to off-screen incident luminous flux at an angle of −10 degrees in a diffractive optical element of Embodiment 1.
Figure 14B:
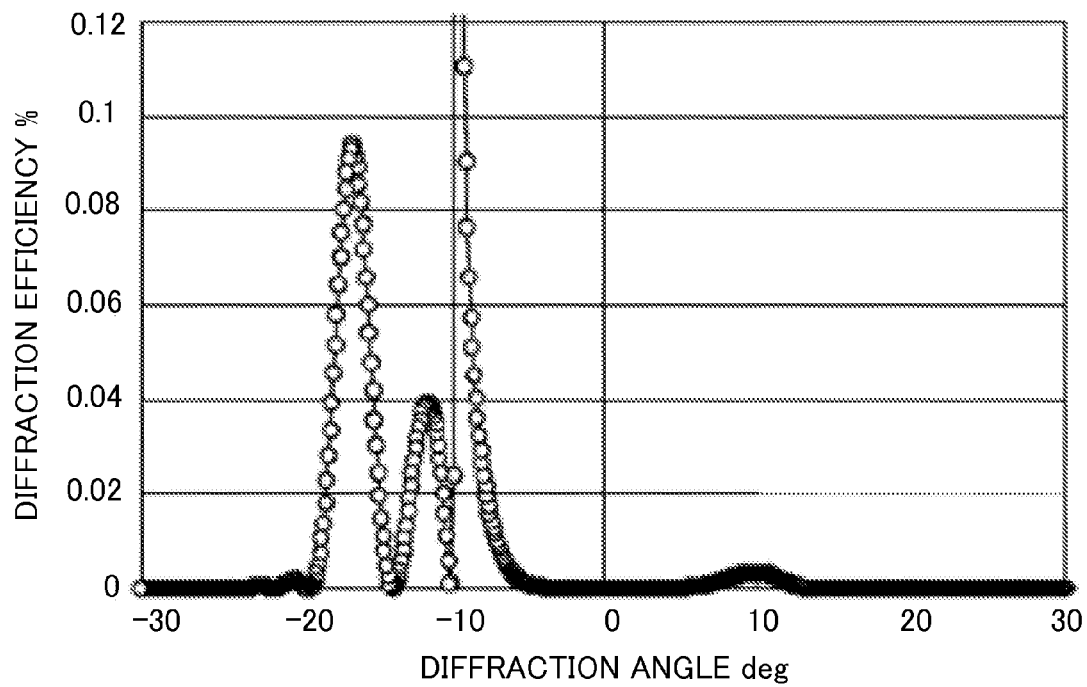

Next, considering luminous flux (light beam c in FIG. 3, and light beam B' in FIG. 11) which enters the diffraction grating part in an upward direction at an obliquely incident angle (off-screen light incident angle) with reference to a designed incident angle, FIGS. 14A and 14B illustrate an RCWA calculation result on conditions that the incident angle is −10 degrees, the grating pitch is 200 μm, and the wavelength is 550 nm. The incident angle is defined so that a downward direction in FIG. 3 is a positive direction, i.e. an upward direction in the m' grating illustrated in FIG. 11 is a positive direction. FIG. 14A is diffraction efficiency in the vicinity of diffracted light of +2nd order that is a designed order. A horizontal axis indicates a diffraction order, and a vertical axis indicates diffraction efficiency. FIG. 14B enlarges a lower part of the diffraction efficiency of the vertical axis of FIG. 14A and is a result of indicating a range of higher diffraction angles where the horizontal axis is changed from a diffraction order to a diffraction angle. The diffraction angle is defined so that a downward direction in FIG. 3 is a positive direction, i.e. an upward direction in the m' grating illustrated in FIG. 11 is a positive direction.

According to FIG. 14A, the diffraction efficiency is concentrated on the +2nd diffracted light that is a designed order, but the diffraction efficiency is 93.92% (the diffraction order is +2nd order, and the diffraction angle is −9.52 degrees) and is decreased since the obliquely incident angle is tilted with reference to zero degree that is a designed incident angle. Since the +2nd order diffracted light of the off-screen luminous flux does not reach the imaging plane 41, its influence is small. The other light, as illustrated in FIG. 14B, propagates as unnecessary light having a peak in a specific angle direction. The unnecessary light has peaks in nearly −16 degrees and −11 degrees directions. The unnecessary light also has a small peak in a nearly +10 degrees direction. The propagation directions of the peaks in the nearly −16 degrees direction and the nearly +10 degrees direction are nearly equal to an emitting direction of −16.6 degrees of the transmitted light and an emitting direction of +9.5 degrees of the reflected light of the incident angle of −10 degrees of the off-screen luminous flux which enters the grating wall surface. Because it enters the grating wall surface from the side of a lower refractive-index material to the side of a higher refractive-index material at +80 degrees, a transmittance of the transmitted light is 94% and a reflectance of the reflected light is 6%, which correspond to a situation where there are a large peak in a nearly −16 degrees direction and also a small peak in a nearly +10 degrees direction. The peak in the −11 degrees direction may be a peak of the unnecessary light of the nearly −16 degrees of the transmitted light and a peak caused by an interference of the +2nd order diffracted light on the wall surface. Each of these unnecessary lights is spread over a higher angle range from the peak. The peak angles of these unnecessary lights are substantially the same as those of FIG. 8B, but the spreads of the angles of the unnecessary lights are different between FIGS. 14B and 8B and FIG. 14B illustrates a sharper peak and the unnecessary light is concentrated on the peak. In other words, the behaviors of the unnecessary lights are different between the designed orders of +1st order and the +2nd order, and it means that the designed order of +2nd order is closer to the phenomenon of the geometric optics. The peak in the −11 degrees direction may be a peak of the unnecessary light of the nearly −16 degrees of the transmitted light and a peak caused by an interference of the +2nd diffracted light.

As illustrated in FIGS. 24, 10, and 11, the unnecessary light generated when the off-screen luminous flux enters the diffractive optical element applied to the actual optical system is as follows. The diffracted light of the unnecessary light generated by the off-screen luminous flux having a diffraction angle nearly equal to +0.21 degree where the designed diffraction order at the designed incident angle propagates reaches the imaging plane. According to the RCWA calculation result, the diffraction efficiencies at the vicinity of the diffraction angle of +0.21 degree in FIG. 14B are 0.0014% in a diffraction order of +96 (at a diffraction angle of +0.24 degree) and 0.0014% in a diffraction order of +95 (at a diffraction angle of +0.14 degree). Since the diffraction efficiencies in the designed order of +1st order are 0.0015% in a diffraction order of +48 (at a diffraction angle of +0.24 degree) and 0.0015% in a diffraction order of +47 (at a diffraction angle of +0.03 degree), the diffraction efficiencies in the designed order of +2nd order are substantially the same as those in the designed order of +1st order. The number of the unnecessary lights reaching the imaging plane in the designed order of +2nd order is twice as compared with that in the designed order of +1st order. Therefore, the diffraction efficiency at the vicinity of the diffraction angle of +0.21 degree having the designed order of +2nd order is converted into 0.0028% that has been doubled. It is increased as compared with the diffraction efficiency of 0.015% of the designed order of +1st order, but the influence on the deterioration of the image performance is small because the numerical value of the diffracted efficiency is extremely small.

As above, in the optical system to which the diffractive optical element of the present invention is applied, when the off-screen luminous flux enters the diffractive optical element, the designed order is changed from the +1st order to the 2nd order. Thus, the unnecessary light of the m grating on which the influence of the unnecessary light illustrated in FIGS. 24, 10, and 11 is great is significantly reduced to be able to be equal to the unnecessary light of the m' grating on which the influence of the unnecessary light is small. As a result, because the unnecessary light reaching the imaging plane is decreased, the deterioration of the image performance can be suppressed. Actually, it has been confirmed that the deterioration of the image performance is suppressed when the diffractive optical element and the optical system are made to take an image. The followings are true for Embodiments 2 to 8.

In the present embodiment, as illustrated in FIGS. 10 and 11, the peak of the unnecessary light is shielded by the stop 40 (light beams Bm− and B'm− in FIG. 10), but it is one example and the present embodiment is not limited to this. For example, the peak of the unnecessary light may be guided to a lens barrel to shield the light to be reflected at an angle where the light does not reach the imaging plane by a lens at a rear side to be able to suppress the peak of the unnecessary light. When the designed order is set to the +2nd order, the unnecessary light comes close to the geometric phenomenon. Therefore, it is easily realized that the angle of the grating wall surface of the diffraction grating is shifted from the principal ray direction, the angle of the grating wall surface is gradually changed, or the shape of the grating wall surface is a step-like shape in order to control the unnecessary light as compared with the case where the designed order is +1st order. It can also be controlled for each zone by changing the shape of the grating wall surface for each zone. As a result, the unnecessary light reaching the imaging plane can be suppressed. In the above embodiment, the unnecessary light is described on condition that the relation of the refractive indexes of the materials of the diffraction gratings 11 and 12 of the diffractive optical element 1 meets n1<n2.

Figure 16:
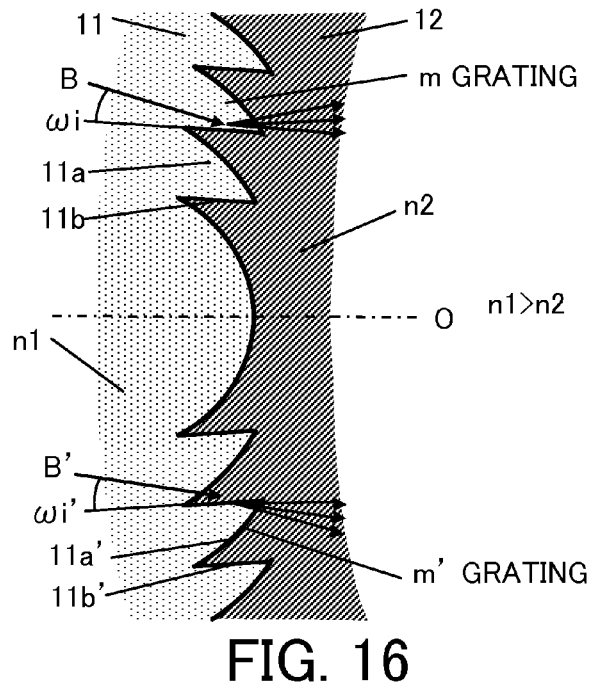
FIG. 16 is a schematic diagram illustrating a relation between an element structure of a diffractive optical element and off-screen incident luminous flux.

Next, a case where the relation of the refractive indexes of the materials of the diffraction gratings 11 and 12 meets n1>n2 will be described. FIG. 16 is an enlarged view of the cross-sectional shape obtained by cutting the diffractive optical element 1 in which the relation of the refractive indexes of the materials of the diffraction gratings 11 and 12 meets n1>n2. Comparing FIG. 11 with FIG. 16, the relation of the refractive indexes is reversed and directions of the grating shapes of the grating parts of the diffraction gratings are also reversed. The component of the luminous flux having the off-screen incident angle of 10 degrees which enters the grating wall surface 11b of the m grating in FIG. 16 enters the grating wall surface 11b at an angle of +80 degrees larger than a critical angle of 76.7 degrees from a side of the higher refractive-index material to a side of the lower refractive-index material. Therefore, a total reflection occurs and the unnecessary light extends to propagate on the grating wall surface 11b in a total reflection emitting direction as a center. Accordingly, the relation is similar to that of FIGS. 6 and 13. The component of the luminous flux having the off-screen incident angle of 10 degrees which enters the grating wall surface 11b' of the m' grating in FIG. 16 is diffracted to the +2nd order light on the grating surface before entering the grating wall surface from the lower refractive-index material to the higher refractive-index material. Therefore, the unnecessary light extends to propagate in a transmitted light emitting direction and a reflected light emitting direction. Thus, the relation is similar to that between FIGS. 8 and 13. As above, the unnecessary light caused by the grating wall surface can be similarly described for both cases where the refractive indexes of the diffraction gratings 11 and 12 have the relations of n1<n2 and n1>n2.

The order of the diffracted light of the unnecessary light by the off-screen luminous flux which has an angle equal to the diffraction angle at which the designed diffracted light at a designed incident angle propagates can be described as follows. The relationship between a designed incident angle θ1 and a diffraction angle θ2 of the designed diffracted light is represented as Expression (5).

$$P \times (n2 \times \sin\theta2 - n1 \times \sin\theta1) = m \times \lambda0 \quad (5)$$

In Expression (5), n1 is a refractive index of a material forming the first diffraction grating 11 at a wavelength λ0, and n2 is a refractive index of a material forming the second diffraction grating 12 at the wavelength λ0. P is a grating pitch of the first diffraction grating 11 and the second diffraction grating 12, and m is a designed diffraction order. Thus, the diffraction angle θ2 of the designed diffracted light is represented by Expression (6).

$$\theta2 = \sin^{-1}\{(m \times \lambda0/P + n1 \times \sin\theta1)/n2\} \quad (6)$$

On the other hand, the relationship among an off-screen incident angle θ1', a diffraction order m', and a diffraction angle θ2' when an off-screen luminous flux enters the diffractive optical element at the off-screen incident angle $\theta 1'$ is represented by Expression (7).

$$P \times (n2 \times \sin \theta 2' - n1 \times \sin \theta 1') = m' \times \lambda 0 \quad (7)$$

Therefore, the diffraction angle $\theta 2'$ is represented by Expression (8).

$$\theta 2' = \sin^{-1}\{(m' \times \lambda 0/P + n1 \times \sin \theta 1')/n2\} \quad (8)$$

In Expression (8), the diffraction angle $\theta 2$ at which the designed diffracted light at the designed incident angle $\theta 1$ propagates is equal to the diffraction angle $\theta 2'$ of the diffracted light of the unnecessary light by the off-screen luminous flux at the incident angle $\theta 1'$. Therefore, Expression (9) is met.

$$\theta 2 = \theta 2' \quad (9)$$

When Expressions (6) and (7) are substituted into Expression (9) and organized, the order m' of the diffracted light of the unnecessary light by the off-screen luminous flux at the incident angle $\theta 1'$ which is equal to the diffraction angle $\theta 2$ at which the designed diffracted light at the designed incident angle $\theta 1$ propagates is represented by Expression (10).

$$m' = m + P \times n1 \times (\sin \theta 1 - \sin \theta 1')/\lambda \quad (10)$$

In Embodiment 1, in accordance with Expression (6), the diffraction angle $\theta 2$ of the designed diffracted light is +0.21 degree (the designed incident angle $\theta 1$ is equal to zero degree). When Expression (10) is calculated on conditions that the off-screen incident angle ($\theta 1'$) is +10 degrees, the designed order (m) is +2nd order, the grating pitch (P) is 200 μm, and the wavelength is 550 nm, the diffraction order m' is −91.7, which is not an integer. When the diffraction angles of −91st and −92nd orders (integers) adjacent to the diffraction order of −91.7 is calculated based on Expression (8), the diffraction angles of the −91st and −92nd orders are +0.27 degree and +0.17 degree, respectively. Thus, the diffracted lights of the unnecessary lights at the diffraction angle $\theta 1$ of the designed diffracted light and at the off-screen incident angle $\theta 1'$ are not perfectly equal to each other, and an angle equal to the diffraction angle of the designed diffracted light exists between the diffraction angles of orders of two integers adjacent to the order obtained by calculation of Expression (10).

Then, both the diffraction efficiencies of −91st order (n21-th order) and −92nd order (n22-th order) are 0.0017% based on the RCWA calculation. Similarly, when Expression (10) is calculated on conditions that the off-screen incident angle is +10 degrees, the designed order is +1st order, the grating pitch is 100 μm, and the wavelength is 550 nm, the diffraction order m' is equal to −45.8, which is not an integer. When the diffraction angles of −45th (n11-th) and −46th (n12-th) orders of integers adjacent to the diffraction order m'=−45.8 is calculated based on Expression (8), the diffraction angles of the −45th and −46th orders are +0.38 degree and +0.17 degree, respectively. Both the diffraction efficiencies of the −45th and −46th orders are 0.0021% based on the RCWA calculation.

When integers adjacent to the numerical value of the order m' which satisfies Expression (10) are defined as nm1 and nm2 (nm2<nm1), n21-th and n22-th orders of the diffraction grating having the designed diffraction order of +2 (m=2) are −91st and −92nd orders, respectively, and both the diffraction efficiencies are 0.0017%. Additionally, n11-th and n12-th orders of the diffraction grating having the designed order of +1 (m=1) are −45th and −46th orders, and both the diffraction efficiencies are 0.0021%.

Furthermore, the number of the unnecessary lights reaching the imaging plane in the designed order of +2nd order is twice as large as that in the designed order of +1st order. Therefore, when a conversion diffraction efficiency is defined as an efficiency of diffracted light of the unnecessary light reaching the imaging plane is multiplied by a designed order, n21-th and n22-th orders of the designed order of +2 (m=2) are −91st and −92nd orders, respectively, and both the diffraction efficiencies are 0.0034%. Additionally, n11-th and n12-th orders of the diffraction grating having the designed order of +1 (m=1) are −45th and −46th orders, and both the diffraction efficiencies are 0.0021%.

Both the products of the diffraction efficiencies and the designed orders of the nm1-th and nm2-th orders adjacent to the numerical value obtained by Expression (10) are small in the designed order of +2nd order as compared with those in the designed order of +1st order. Accordingly, the unnecessary light of the off-screen luminous flux reaching the imaging plane is decreased and the deterioration of the image performance can be suppressed.

Embodiment 2

Although Embodiment 1 describes the case where the designed order is +2nd order, Embodiment 2 will describe a case where the designed order is +3rd order. With regard to a specific configuration of the diffraction grating part, the diffraction grating 11 is formed by a grating forming material of an ultraviolet curable resin mixed with fine particles of nd=1.479, vd=20.7, θgF=0.404, and n550=1.483. The diffraction grating 12 is formed by a grating forming material using an ultraviolet curable resin of nd=1.522, vd=51.3, θgF=0.539, and n550=1.524. A grating height d of both the grating parts is 40.53 μm, and the designed order is +3rd order that is equal to or greater than 2nd order.

Figure 17A:
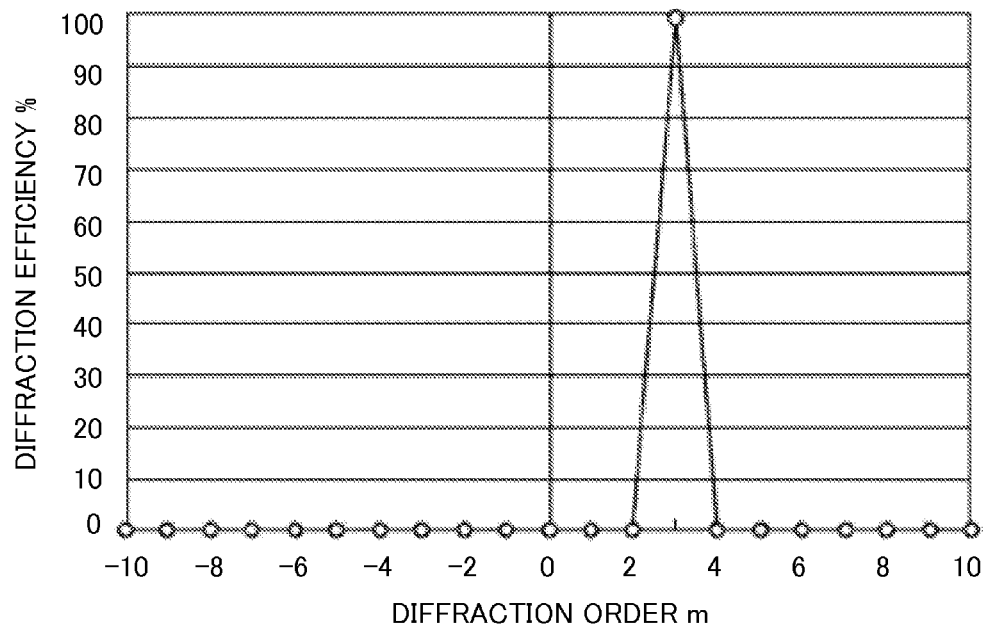
FIGS. 17A and 17B are graphs of diffraction efficiency with respect to designed incident luminous flux in a diffractive optical element of Embodiment 2.
Figure 17B:
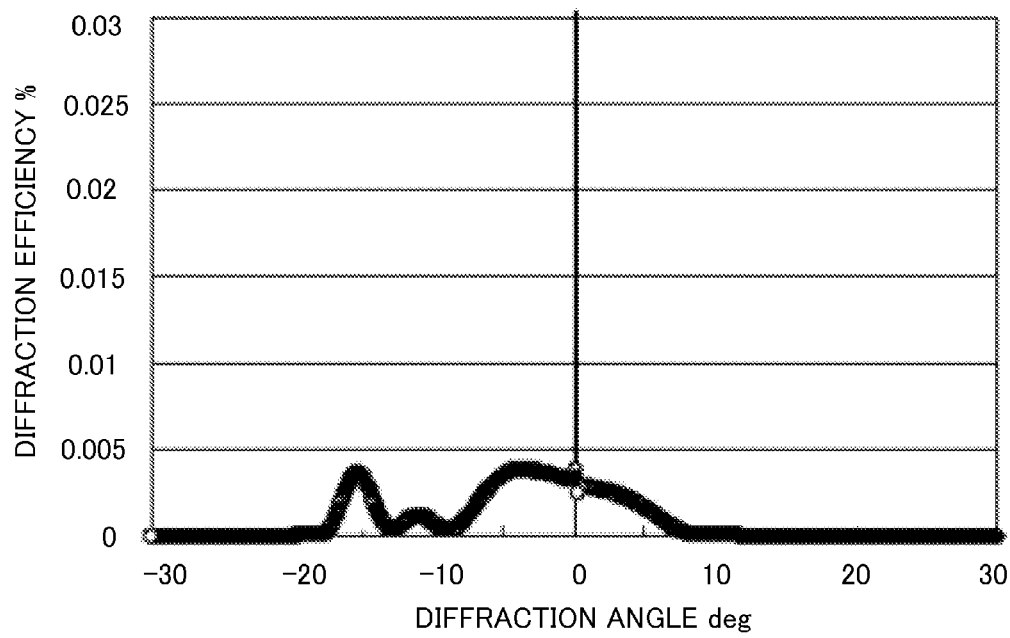

The material used as the diffraction grating is the same as that of Embodiment 1. Compared with the case of the designed order of +1st order, in the case of the designed order of +3rd order, the phase function is ⅓ and the grating pitch is three times. Thus, an emitting angle of +3rd order diffracted light having the designed order of +3rd order and an emitting angle of +1st order diffracted light having the designed order of +1st order are equal to each other, and the optical characteristics of the designed order of the diffracted grating part are the same. The number of the gratings is also ⅓. FIGS. 17A and 17B illustrate an RCWA calculation result on conditions that the designed incident angle of the diffraction grating is zeroth degree (light beam "a" in FIG. 3), the grating pitch is 300 μm, and the wavelength is 550 nm.

FIG. 17A is diffraction efficiency in the vicinity of +3rd diffracted light that is a designed order. A horizontal axis indicates a diffraction order, and a vertical axis indicates diffraction efficiency. FIG. 17B enlarges a lower part of the diffraction efficiency of the vertical axis of FIG. 17A and is a result of indicating a range of higher diffraction angles where the horizontal axis is changed from a diffraction order to a diffraction angle. The diffraction angle is defined so that a downward direction in FIG. 3 is a positive direction. According to FIG. 17A, the diffraction efficiency of the +3rd diffracted light that is the designed order is 99.20% (the diffraction angle of +0.21 degree), which is equal to or greater than 98.49% (the diffraction angle of +0.21 degree) that is the diffracted efficiency of the +1st diffracted light in the case where the designed order is +1st order. The other light is unnecessary light, and propagates as unnecessary light having a peak in a specific angle direction as illustrated in FIG. 17B.

The behaviors of the unnecessary lights in the designed orders of the +1st and +3rd orders are different from each other. However, similarly to FIG. 5, a component (light beam) a' entering the vicinity of the grating wall surface 11b of the incident luminous flux may be rotationally moved so as to be reflected to the side of the high refractive-index material on the grating wall surface 11b and the emitting angle is shifted to the side of the large angle as compared with that of the +1st designed order. Thus, the behaviors of the unnecessary lights having the designed orders of +1st and +3rd orders are different from each other. It is assumed that the grating pitch is 300 μm (100 μm in the designed order of +1st order) as one reference. As illustrated in FIG. 1, because the grating pitch is larger and the bad influence by the grating wall surface is reduced as the zones are close to the optical axis, the diffraction efficiency of the designed order is higher and the diffraction efficiency of the unnecessary light is lower. In the present embodiment, considering the entire region of the diffractive optical element, the difference of the diffraction efficiencies of the grating pitch 300 μm (100 μm in the designed order of the 1st order) is rarely influenced and as a result there is no problem because it is unusual that a high brightness light source such as the sun in the daytime is directly imaged at the designed incident angle (imaging light incident angle).

Figure 18A:
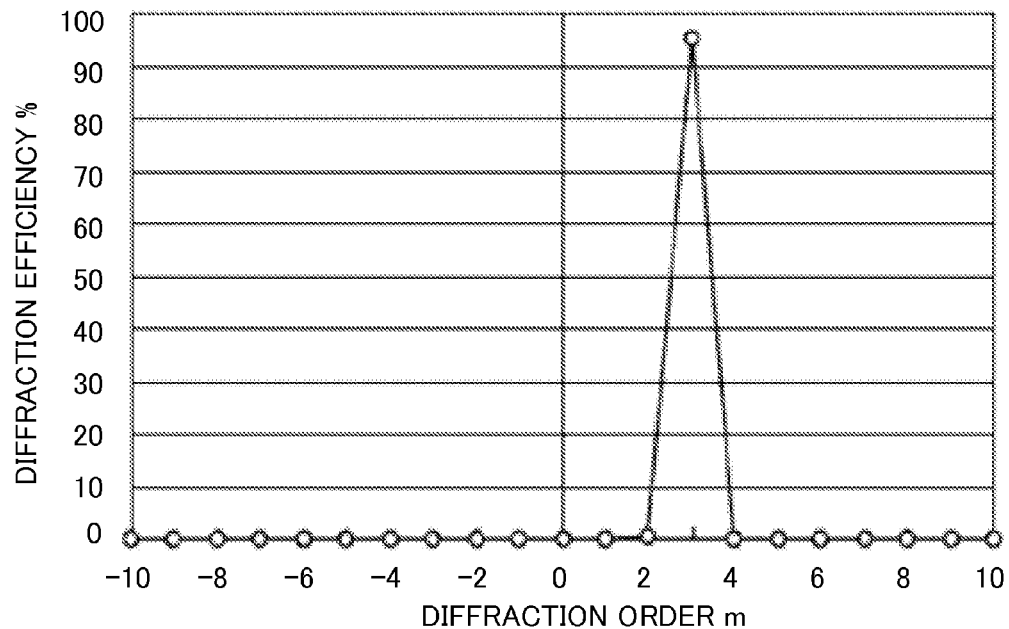
FIGS. 18A and 18B are graphs of diffraction efficiency with respect to off-screen incident luminous flux at an angle of +10 degrees in a diffractive optical element of Embodiment 2.
Figure 18B:
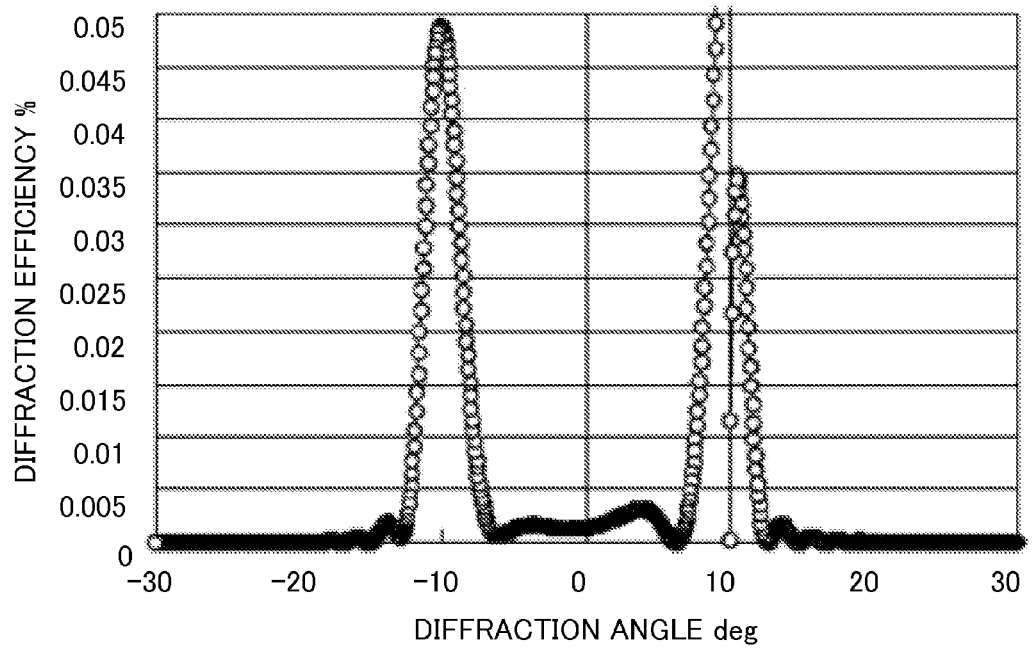

Considering luminous flux (light beam "b" in FIG. 3, and light beam "B" in FIG. 11) which enters the diffraction grating part in a downward direction at an obliquely incident angle (off-screen light incident angle) with reference to a designed incident angle, FIGS. 18A and 18B illustrate an RCWA calculation result on conditions that the incident angle is +10 degrees, the grating pitch is 300 μm, and the wavelength is 550 nm. FIG. 18A is diffraction efficiency in the vicinity of +3rd diffracted light that is a designed order. FIG. 18B enlarges a lower part of the diffraction efficiency of the vertical axis of FIG. 18A and is a result of indicating a range of higher diffraction angles where the horizontal axis is changed from a diffraction order to a diffraction angle.

According to FIG. 18A, the diffraction efficiency of the +3rd order diffracted light that is a designed order is 95.26% (the diffraction order is +3rd order, and the diffraction angle is +9.94 degrees), and it is decreased since the obliquely incident angle is tilted with reference to zero degree that is a designed incident angle. Since the +3rd order diffracted light of the off-screen incident angle does not reach the imaging plane, its influence is small. The other light, as illustrated in FIG. 16B, propagates as unnecessary light having a peak in a specific angle direction. The unnecessary light has a peak in a nearly –10 degrees direction, and its propagation direction is nearly equal to an emitting direction of –9.94 degrees in which a component of the luminous flux having the off-screen incident angle of +9.94 degrees which enters the grating wall surface is totally reflected to be propagated after being diffracted as a +3rd order light on the grating surface.

Because the unnecessary light enters the grating wall surface from the side of a higher refractive-index material to the side of a lower refractive-index material at +80.6 degrees larger than a critical angle of 76.7 degrees, the total reflection is generated. Although the peak angle of the unnecessary light in the –10 degrees direction is substantially the same as that of FIGS. 6B and 13B, the spread of the angle of the unnecessary light has a peak sharper than that of FIG. 13B and the unnecessary light is concentrated on the peak. In other words, the behaviors of the unnecessary lights having the designed orders of the +1st, +2nd, and +3rd orders are different from one another, and the behaviors of unnecessary lights of the +2nd and +3rd orders have the similar tendency and it means that the unnecessary light of the +3rd order is closer to the phenomenon of the geometric optics.

As illustrated in FIGS. 24, 10, and 11, the unnecessary light generated when the off-screen luminous flux enters the diffractive optical element applied to the actual optical system is as follows. The diffracted light of the unnecessary light generated by the off-screen luminous flux having a diffraction angle nearly equal to +0.21 degree where the designed diffraction order at the designed incident angle propagates reaches the imaging plane. According to the RCWA calculation result, the diffraction efficiencies at the vicinity of the diffraction angle of +0.21 degree in FIG. 13B are 0.0014% in a diffraction order of –137 (at a diffraction angle of +0.24 degree) and 0.0014% in a diffraction order of –138 (at a diffraction angle of +0.17 degree). When the designed order is +1st order, the diffraction efficiencies are 0.021% in a diffraction order of –45 (at a diffraction angle of +0.38 degree) and 0.021% in a diffraction order of –46 (at a diffraction angle of +0.17 degree). Thus, the diffraction efficiencies are significantly decreased as compared with the case of the designed order of +1st order. The number of the unnecessary lights reaching the imaging plane in the designed order of +3rd order is three times as large as that in the designed order of +1st order. Therefore, the diffraction efficiency at the vicinity of the diffraction angle of +0.21 degree having the designed order of +3rd order is converted into 0.0042% that has been tripled. It is significantly decreased as compared with the diffraction efficiency of 0.021% of the designed order of +1st order.

Figure 19A:
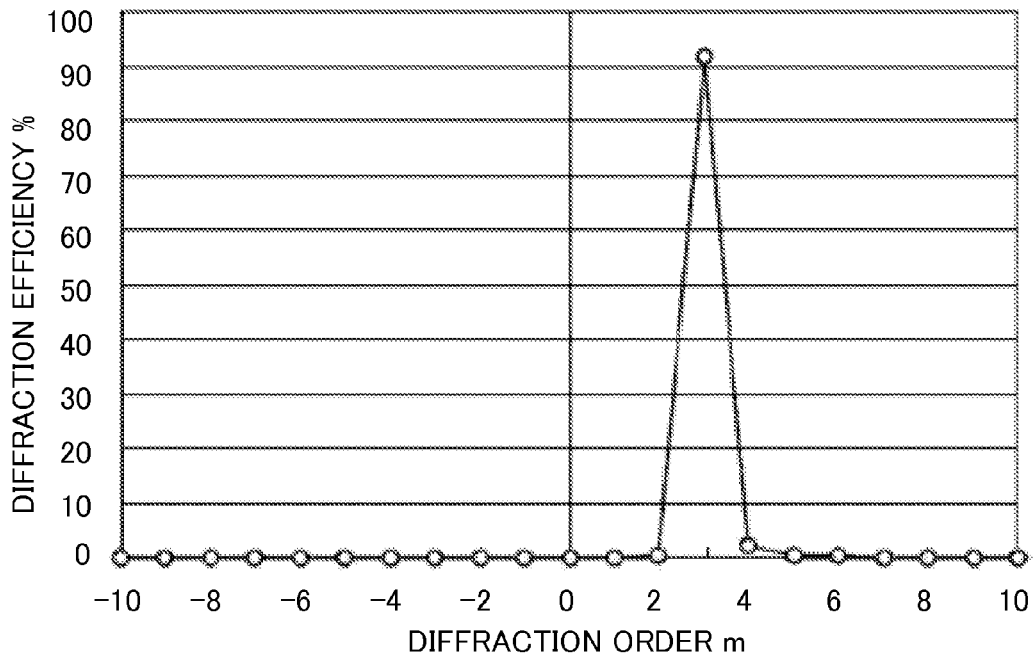
FIGS. 19A and 19B are graphs of diffraction efficiency with respect to off-screen incident luminous flux at angle of −10 degrees in a diffractive optical element of Embodiment 2.
Figure 19B:
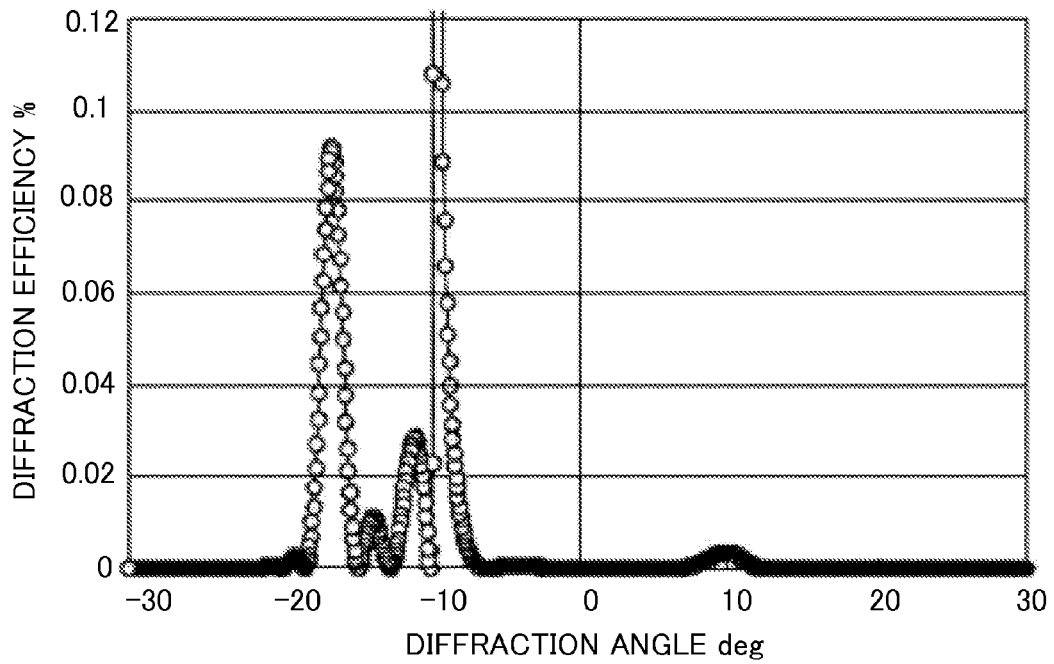

Next, considering luminous flux (light beam c in FIG. 3, and light beam B' in FIG. 11) which enters the diffraction grating part in an upward direction at an obliquely incident angle (off-screen light incident angle) with reference to a designed incident angle, FIGS. 19A and 19B illustrate an RCWA calculation result on conditions that the incident angle is –10 degrees, the grating pitch is 300 μm, and the wavelength is 550 nm. FIG. 19A is diffraction efficiency in the vicinity of +3rd diffracted light that is a designed order. A horizontal axis indicates a diffraction order, and a vertical axis indicates diffraction efficiency. FIG. 19B enlarges a lower part of the diffraction efficiency of the vertical axis of FIG. 19A and is a result of indicating a range of higher diffraction angles where the horizontal axis is changed from a diffraction order to a diffraction angle. According to FIG. 19A, the diffraction efficiency of the diffracted light of +3rd order that is the designed order is 91.68% (the diffraction angle of –9.52 degrees), which is decreased because the obliquely incident angle is tilted with reference to zero degree that is the designed incident angle.

Since the +3rd order diffracted light of the off-screen incident angle does not reach the imaging plane, its influence is small. The other light, as illustrated in FIG. 19B, propagates as unnecessary light having a peak in a specific angle direction. The unnecessary light has peaks in nearly –16.5 degrees, –14 degrees, –11 degrees, and +10 degrees directions. The propagation directions of the peaks in the nearly –16.5 degrees and +10 degrees directions are equal to the emitting direction of –16.6 degrees of the transmitted light and the emitting direction of +9.5 degrees of the reflected light of the luminous flux having the off-screen incident angle of –10 degrees which enters the grating wall surface. Because the unnecessary light enters the grating wall surface from the side of a lower refractive-index material to the side of a higher refractive-index material at +80 degrees, the transmittance of the transmitted light is 94% and the reflectance of the refracted light is 6%, which corresponds to the phenomena that the peak in the nearly –16.5 degrees direction is large and that the peak in the nearly +10 degrees direction is small. The peaks in the –14 degrees and –11 degrees directions may be an unnecessary light peak of the nearly −16.5 degrees of the transmitted light on the wall surface and a peak caused by the interference of the diffracted light of the +3rd order. Each of the unnecessary lights is spread over a higher-angle range. Although the angles of these unnecessary light peaks are substantially the same as those of FIGS. 8B and 14B, the spread of the angle of the unnecessary light has a peak sharper than that of FIG. 14B, which means that the peak is concentrated on the peak. In other words, the behaviors of the unnecessary lights are different among the +1st and +2nd and +3rd designed orders, and it means that the behavior of the +3rd designed order is closer to the phenomenon of the geometric optics although the behaviors of the +2nd and +3rd designed orders are comparatively similar. The peaks in the −14 degrees and −11 degrees directions may be an unnecessary light peak of the nearly −16.5 degrees of the transmitted light on the wall surface and a peak caused by the interference of the diffracted light of the +3rd order.

As illustrated in FIGS. 24, 10, and 11, the unnecessary light generated when the off-screen luminous flux enters the diffractive optical element applied to the actual optical system is as follows. The diffracted light of the unnecessary light generated by the off-screen luminous flux having a diffraction angle nearly equal to +0.21 degree where the designed diffraction order at the designed incident angle propagates reaches the imaging plane. According to the RCWA calculation result, the diffraction efficiencies at the vicinity of the diffraction angle of +0.21 degree in FIG. 19B are 0.00091% in a diffraction order of +144 (at a diffraction angle of +0.24 degree) and 0.00092% in a diffraction order of +143 (at a diffraction angle of +0.17 degree). When the designed order is +1st order, the diffraction efficiencies are 0.0015% in a diffraction order of +48 (at a diffraction angle of +0.24 degree) and 0.0015% in a diffraction order of +47 (at a diffraction angle of +0.03 degree). Thus, the diffraction efficiencies are further decreased as compared with the case of the designed order of +1st order. The number of the unnecessary lights reaching the imaging plane in the designed order of +3rd order is three times as large as that in the designed order of +1st order. Therefore, the diffraction efficiency at the vicinity of the diffraction angle of +0.21 degree having the designed order of +3rd order is converted into 0.0027% that has been tripled. It is significantly decreased as compared with the diffraction efficiency of 0.015% of the designed order of +1st order.

As above, in the optical system to which the diffractive optical element of the present invention is applied, when the off-screen luminous flux enters the diffractive optical element, the designed order is changed from the +1st order to the +3rd order. Thus, the unnecessary light of the m grating on which the influence of the unnecessary light illustrated in FIGS. 24, 10, and 11 is great can be significantly reduced. The unnecessary light of the m' grating on which the influence of the unnecessary light is small can also be reduced. As a result, because the unnecessary light reaching the imaging plane is decreased, the deterioration of the image performance can be suppressed. Actually, it has been confirmed that the deterioration of the image performance is suppressed when the diffractive optical element and the optical system are made to take an image. As described in Embodiments 1 and 2, the diffraction grating part of the present invention has a designed order equal to or greater than +2nd order. Therefore, the light which enters the grating wall surface by the off-screen incident light and emits by transmitting through and reflecting on the grating wall surface comes closer to the phenomenon of the geometric optics. Therefore, the unnecessary light is prevented from reaching the imaging plane to be able to suppress the deterioration of the image performance.

Embodiment 3

Embodiment 3 will describe a case where a material of the diffraction grating and a grating height of the grating part are different from those in Embodiment 1. With regard to a specific configuration of the diffraction grating part of the present invention, the diffraction grating 11 is formed by a grating forming material of an ultraviolet curable resin mixed with fine particles of nd=1.504, vd=16.3, θgF=0.390, n550=1.511. The diffraction grating 12 is formed by a grating forming material using an ultraviolet curable resin mixed with fine particles of nd=1.567, vd=47.0, θgF=0.569, and n550=1.570. The grating height d of both the grating parts is 18.57 μm, and a designed order is +2nd order. Compared with the case of the designed order of +1st order (the grating height is ½), the phase function is ½ and the grating pitch is twice in a case of the designed order of +2nd order. Thus, the emitting angles of the diffracted lights having the designed orders of +2nd order and +1st order are equal to each other, and the optical characteristics of the designed orders are equivalent to each other. Furthermore, the number of gratings is ½.

As a result of the RCWA calculation on conditions that the incident angle that is a designed incident angle of the diffraction grating part is zero degree (light beam "a" in FIG. 3), the grating pitch is 200 μm, and the wavelength is 550 nm, the diffraction efficiency of the diffracted light of the designed order of +2nd order is 99.05% (the diffraction angle of +0.20 degree). It is equal to or greater than the diffraction efficiency of the diffracted light having the designed order of +1st order (the material of each diffraction grating is the same, the grating height is 9.29 μm, and the grating pitch is 100 μm) that is 98.76% (the diffraction angle of +0.20 degree). The difference of the unnecessary lights having the designed orders of +1st and +2nd orders is rarely influenced because it is unusual that a high brightness light source such as the sun in the daytime is directly imaged at the designed incident angle.

Figure 20A:
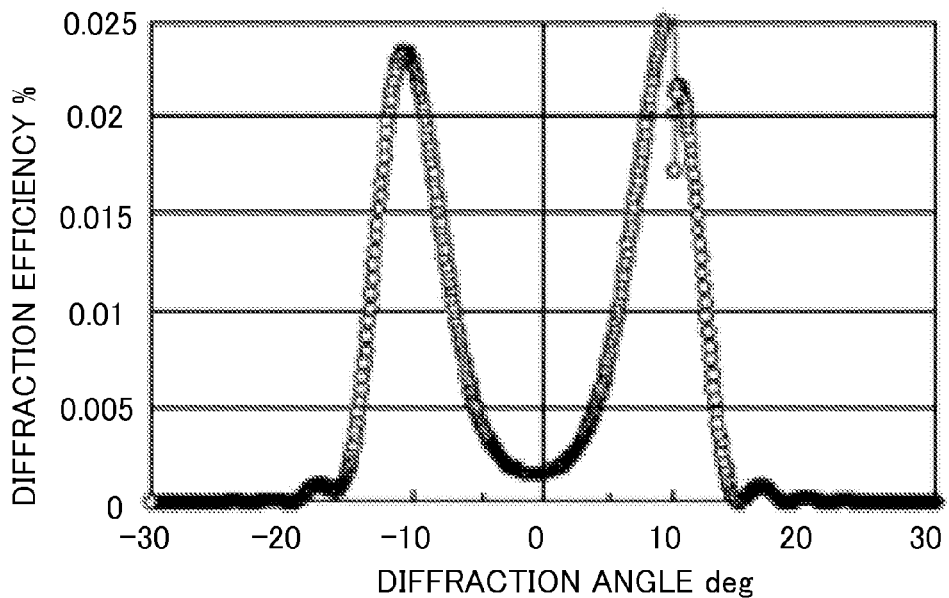
FIGS. 20A to 20D are graphs of diffraction efficiency with respect to off-screen incident luminous flux at an angle of +10 degrees in a conventional diffractive optical element of Embodiments 3 and 4.
Figure 20B:
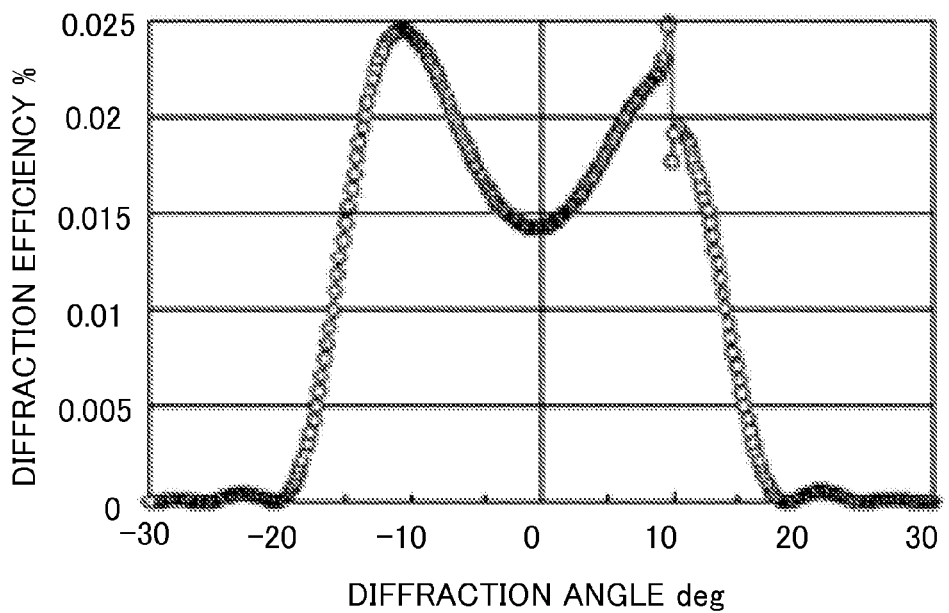

Considering luminous flux (light beam "b" in FIG. 3, and light beam "B" in FIG. 11) which enters the diffraction grating part in a downward direction at an obliquely incident angle (off-screen light incident angle) with reference to a designed incident angle, FIG. 20A illustrates an RCWA calculation result on conditions that the incident angle is +10 degrees, the grating pitch is 200 μm, and the wavelength is 550 nm. FIG. 20B illustrates an RCWA calculation result on condition that the designed order is +1st order. FIGS. 20A and 20B are results in which the vertical axes enlarge lower parts of the diffraction efficiencies and the horizontal axes indicate ranges of higher diffraction angles as diffraction angles. In both of FIGS. 20A and 20B, the unnecessary light propagates as unnecessary light having a peak in a specific angle direction. The unnecessary light has a peak in a nearly −10 degrees direction, and its propagation direction is substantially equal to an emitting direction of −9.94 degrees in which a component of the luminous flux having the off-screen incident angle of +9.94 degrees which enters the grating wall surface is totally reflected to be propagated after being diffracted as +2nd order light on the grating surface. Because the unnecessary light enters the grating wall surface from the side of a higher refractive-index material to the side of a lower refractive-index material at +80.6 degrees larger than a critical angle of 74.2 degrees, the total reflection is generated. In FIGS. 20A and 20B, the peak angles of the unnecessary lights in the −10 degrees direction are substantially the same, but the spread of the angle of the unnecessary light in FIG. 20A has a sharper peak and the unnecessary light is concentrated on the peak. In other words, the behaviors of the unnecessary lights having the designed orders of +1st and +2nd orders are different from each other, and it means that the unnecessary light having the designed order of +1st order is closer to the phenomenon of the geometric optics. This relation is the same as that of Embodiment 1. As illustrated in FIGS. 24, 10, and 11, the unnecessary light generated when the off-screen luminous flux enters the diffractive optical element applied to the actual optical system is as follows. The diffracted light of the unnecessary light generated by the off-screen luminous flux having a diffraction angle nearly equal to +0.20 degree where the designed diffraction order at the designed incident angle propagates reaches the imaging plane. According to the RCWA calculation result, the diffraction efficiencies at the vicinity of the diffraction angle of +0.20 degree in FIG. 20A are 0.0015% in a diffraction order of −93 (at a diffraction angle of +0.24 degree) and 0.0015% in a diffraction order of −94 (at a diffraction angle of +0.14 degree). When the designed order is +1st order, the diffraction efficiencies are 0.014% in a diffraction order of −46 (at a diffraction angle of +0.34 degree) and 0.014% in a diffraction order of −44 (at a diffraction angle of +0.14 degree). Thus, the diffraction efficiencies are significantly decreased as compared with the case of the designed order of +1st order. The number of the unnecessary lights reaching the imaging plane in the designed order of +2nd order is twice as large as that in the designed order of +1st order. Therefore, the diffraction efficiency at the vicinity of the diffraction angle of +0.21 degree having the designed order of +2nd order is converted into 0.0030% that has been doubled, but it is significantly decreased as compared with the diffraction efficiency of 0.014% of the designed order of +1st order.

With regard to luminous flux (light beam c in FIG. 3, and light beam B' in FIG. 11) which enters the diffraction grating part at an obliquely incident angle (off-screen light incident angle) with reference to a designed incident angle, an RCWA calculation has been performed. The diffraction efficiencies of the unnecessary light which emits at a diffraction angle substantially equal to the diffraction angle of 0.20 degree of the designed order are 0.0017% in the diffraction order of +98 (the diffraction angle of +0.26 degree) and 0.0017% in the diffraction order of +97 (the diffraction angle of +0.16 degree). Since the diffraction efficiencies in the designed order of +1st order are 0.0021% in a diffraction order of +49 (at a diffraction angle of +0.26 degree) and 0.0022% in a diffraction order of +48 (at a diffraction angle of +0.058 degree), the diffraction efficiencies in the designed order of +2nd order are significantly decreased as compared with those in the designed order of +1st order. The number of the unnecessary lights reaching the imaging plane in the designed order of +2nd order is twice as large as that in the designed order of +1st order. Therefore, the diffraction efficiency at the vicinity of the diffraction angle of +0.21 degree in the designed order of +2nd order is converted into 0.0034% that has been doubled. The diffraction efficiency is increased as compared with the diffraction efficiency of 0.0021% in the designed order of +1st order. However, because the numerical value of the diffraction efficiency is extremely small, the influence on the deterioration of the image performance is small.

As above, in the optical system to which the diffractive optical element of the present invention is applied, when the off-screen luminous flux enters the diffractive optical element, the designed order is changed from the +1st order to the +2nd order. Thus, the unnecessary light of the m grating on which the influence of the unnecessary light illustrated in FIGS. 24, 10, and 11 is great can be significantly reduced. The unnecessary light of the m' grating on which the influence of the unnecessary light is small can also be slightly reduced. As a result, because the unnecessary light reaching the imaging plane is decreased, the deterioration of the image performance can be suppressed. Actually, it has been confirmed that the deterioration of the image performance is suppressed when the diffractive optical element and the optical system are made to take an image.

According to Embodiment 3, the present invention is not limited to the material or the grating height of the diffraction grating of the diffractive optical element described above. As a fine particle material, an inorganic fine particle material of any one of an oxide, a metal, a ceramics, a compound, a mixture is used, and the present invention is not limited to the fine particle material. Furthermore, it is preferable that the average particle diameter of the fine particle material is equal to or less than ¼ of the wavelength (the used wavelength or the designed wavelength) of the incident light into the diffraction grating part. If the particle diameter is larger than that, the effect of the Rayleigh scattering may be larger when the fine particle material is mixed with a resin material. As a resin material with which the fine particle material is mixed, an ultraviolet curable resin of any one of acrylic, fluorinated, vinyl, epoxy organic resins, but the present invention is not limited to these resin materials.

Embodiment 4

Embodiment 4 will describe a case where the material of the diffraction grating and the grating height of the grating part are different from those in Embodiments 1 to 3. With regard to a specific configuration of the diffraction grating part, the diffraction grating 11 is formed by a grating forming material of an ultraviolet curable resin mixed with fine particles of nd=1.682, νd=13.4, θgF=0.480, and n550=1.694. The diffraction grating 12 is formed by a grating forming material using a glass K-VC89 of nd=1.810, νd=41.0, θgF=0.567, and n550=1.814. The grating height d of both the grating parts is 18.57 μm and the designed order is +2nd order.

Compared with the case of the designed order of +1st order (the grating height is ½), the phase function is ½ and the grating pitch is twice in a case of the designed order of +2nd order. Thus, the emitting angles of the diffracted lights having the designed orders of +2nd order and +1st order are equal to each other, and the optical characteristics of the designed orders are equivalent to each other. Furthermore, the number of gratings is ½.

As a result of the RCWA calculation on conditions that the incident angle that is a designed incident angle of the diffraction grating part is zero degree (light beam "a" in FIG. 3), the grating pitch is 200 μm, and the wavelength is 550 nm, the diffraction efficiency of the diffracted light having the designed order of +2nd order is 99.37% (the diffraction angle of +0.17 degree). It is equal to or greater than the diffraction efficiency of the diffracted light having the designed order of +1st order (the material of each diffraction grating is the same, the grating height is 4.56 μm, and the grating pitch is 100 μm) that is 99.18% (the diffraction angle of +0.17 degree).

Figure 20C:
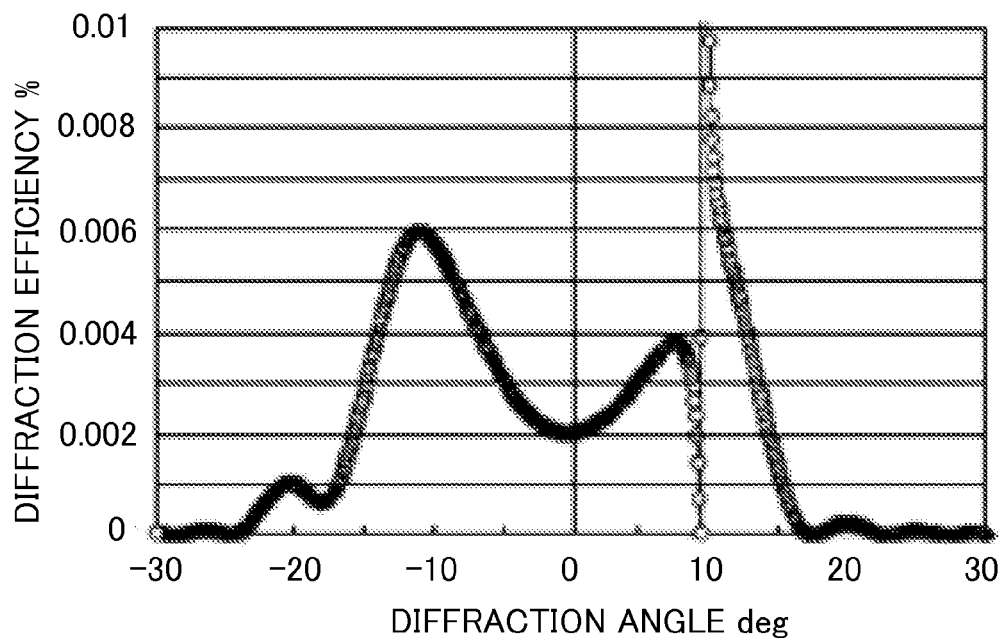

Considering luminous flux (light beam b in FIG. 3, and light beam B in FIG. 11) which enters the diffraction grating part in a downward direction at an obliquely incident angle (off-screen light incident angle) with reference to a designed incident angle, FIG. 20C illustrates an RCWA calculation result on conditions that the incident angle is +10 degrees, the grating pitch is 200 μm, and the wavelength is 550 nm. FIG.

Figure 20D:
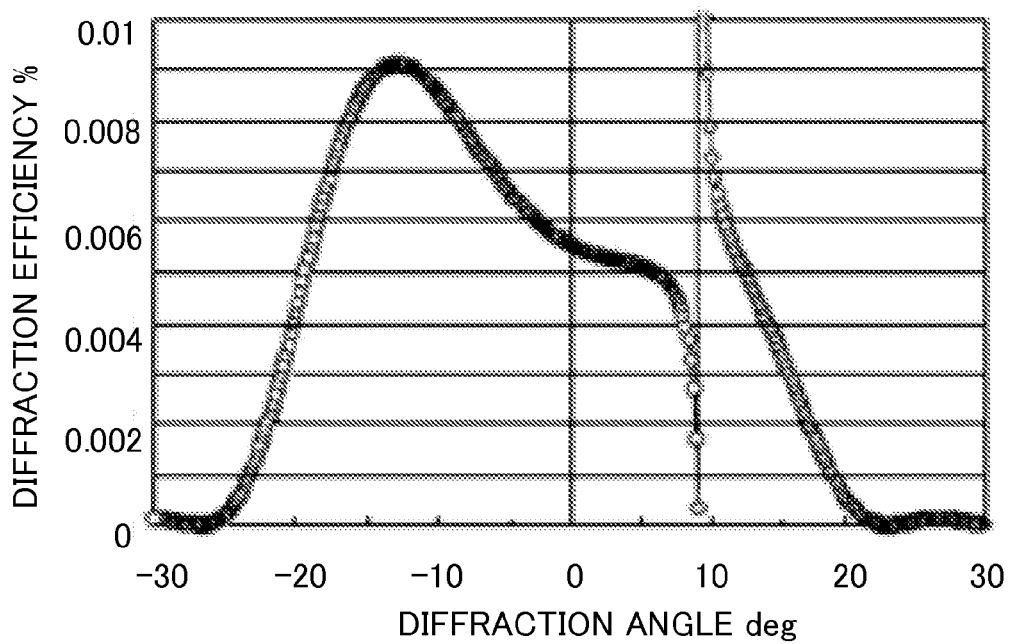

20D illustrates an RCWA calculation result on condition that the designed order is +1st order. FIGS. 20C and 20D are results in which the vertical axes enlarge lower parts of the diffraction efficiencies and the horizontal axes indicate ranges of higher diffraction angles as diffraction angles. In both of FIGS. 20C and 20D, the unnecessary light propagates as unnecessary light having a peak in a specific angle direction. The unnecessary light has a peak in a nearly −10 degrees direction, and its propagation direction is substantially equal to an emitting direction of −9.94 degrees in which a component of the luminous flux having the off-screen incident angle of +9.94 degrees which enters the grating wall surface is totally reflected to be propagated after being diffracted as +2nd order light on the grating surface.

Because the unnecessary light enters the grating wall surface from the side of a higher refractive-index material to the side of a lower refractive-index material at +80.6 degrees larger than a critical angle of 69.0 degrees, the total reflection is generated. In FIGS. 20C and 20D, the peak angles of the unnecessary lights in the −10 degrees direction are substantially the same, but the spread of the angle of the unnecessary light in FIG. 20C has a sharper peak and the unnecessary light is concentrated on the peak. In other words, the behaviors of the unnecessary lights having the designed orders of +1st and +2nd orders are different from each other, and it means that the unnecessary light having the designed order of +2nd order is close to the phenomenon of the geometric optics. This relation is the same as that of Embodiments 1 and 3. As illustrated in FIGS. 24, 10, and 11, the unnecessary light generated when the off-screen luminous flux enters the diffractive optical element applied to the actual optical system is as follows. The diffracted light of the unnecessary light generated by the off-screen luminous flux having a diffraction angle nearly equal to +0.17 degree where the designed diffraction order at the designed incident angle propagates reaches the imaging plane. According to the RCWA calculation result, the diffraction efficiencies at the vicinity of the diffraction angle of +0.17 degree in FIG. 20C are 0.0020% in a diffraction order of −104 (at a diffraction angle of +0.25 degree) and 0.0020% in a diffraction order of −105 (at a diffraction angle of +0.17 degree). When the designed order is +1st order, the diffraction efficiencies are 0.0056% in a diffraction order of −52 (at a diffraction angle of +0.25 degree) and 0.0056% in a diffraction order of −53 (at a diffraction angle of +0.081 degree). Thus, the diffraction efficiencies are significantly decreased as compared with the case of the designed order of +1st order. The number of the unnecessary lights reaching the imaging plane in the designed order of +2nd order is twice as large as that in the designed order of +1st order. Therefore, the diffraction efficiency at the vicinity of the diffraction angle of +0.21 degree having the designed order of +2nd order is converted into 0.0040% that has been tripled, and it is decreased as compared with the diffraction efficiency of 0.0056% of the designed order of +1st order.

With regard to luminous flux (light beam c in FIG. 3, and light beam B' in FIG. 11) which enters the diffraction grating part in an upward direction at an obliquely incident angle (off-screen light incident angle) with reference to a designed incident angle, an RCWA calculation has been performed. The diffraction efficiencies of the unnecessary light which emits at a diffraction angle substantially equal to the diffraction angle of 0.17 degree of the designed order are 0.00060% in the diffraction order of +109 (the diffraction angle of +0.18 degree) and 0.00061% in the diffraction order of +108 (the diffraction angle of +0.092 degree). Since the diffraction efficiencies in the designed order of +1st order are 0.0017% in a diffraction order of +55 (at a diffraction angle of +0.27 degree) and 0.0017% in a diffraction order of +54 (at a diffraction angle of +0.092 degree), the diffraction efficiencies in the designed order of +2nd order are decreased as compared with those in the designed order of +1st order. The number of the unnecessary lights reaching the imaging plane in the designed order of +2nd order is twice as large as that in the designed order of +1st order. Therefore, the diffraction efficiency at the vicinity of the diffraction angle of +0.21 degree in the designed order of +2nd order is converted into 0.0012 that has been doubled. The diffraction efficiency is decreased as compared with the diffraction efficiency of 0.0017% in the designed order of +1st order.

As above, in the optical system to which the diffractive optical element of the present invention is applied, when the off-screen luminous flux enters the diffractive optical element, the designed order is changed from the +1st order to the +2nd order. Thus, the unnecessary light of the m grating on which the influence of the unnecessary light illustrated in FIGS. 24, 10, and 11 is great can be significantly reduced. The unnecessary light of the m' grating on which the influence of the unnecessary light is small can also be reduced. As a result, because the unnecessary light reaching the imaging plane is decreased, the deterioration of the image performance can be suppressed. Actually, it has been confirmed that the deterioration of the image performance is suppressed when the diffractive optical element and the optical system are made to take an image. According to Embodiment 4, the present invention is independent of the diffraction grating material and the grating height of the diffractive optical element, and the present invention is not limited to the above material and grating height.

Embodiment 5

Embodiment 5 will describe a case where the material of the diffraction grating and the grating height of the grating part are different from those in Embodiments 1 to 4. With regard to a specific configuration of the diffraction grating part, the diffraction grating 11 is formed by a grating forming material of an ultraviolet curable resin mixed with fine particles of nd=1.653, vd=9.6, θgF=0.37, and n550=1.667. The diffraction grating 12 is formed by a grating forming material using light-transmissive ceramics of nd=1.83, vd=52, θgF=0.55, and n550=1.836. The grating height d of both the grating parts is 6.51 μm and the designed order is +2nd order. Compared with the case of the designed order of +1st order (the grating height is ½), the phase function is ½ and the grating pitch is twice in a case of the designed order of +2nd order. Thus, the emitting angles of the diffracted lights having the designed orders of +2nd order and +1st order are equal to each other, and the optical characteristics of the designed orders are equivalent to each other. Furthermore, the number of gratings is ½.

As a result of the RCWA calculation on conditions that the incident angle that is a designed incident angle of the diffraction grating part is zero degree (light beam "a" in FIG. 3), the grating pitch is 200 μm, and the wavelength is 550 nm, the diffraction efficiency of the diffracted light having the designed order of +2nd order is 99.47% (the diffraction angle of +0.17 degree). It is equal to or greater than the diffraction efficiency of the diffracted light having the designed order of +1st order (the material of each diffraction grating is the same, the grating height is 3.26 μm, and the grating pitch is 100 μm) that is 99.30% (the diffraction angle of +0.17 degree).

Figure 21A:
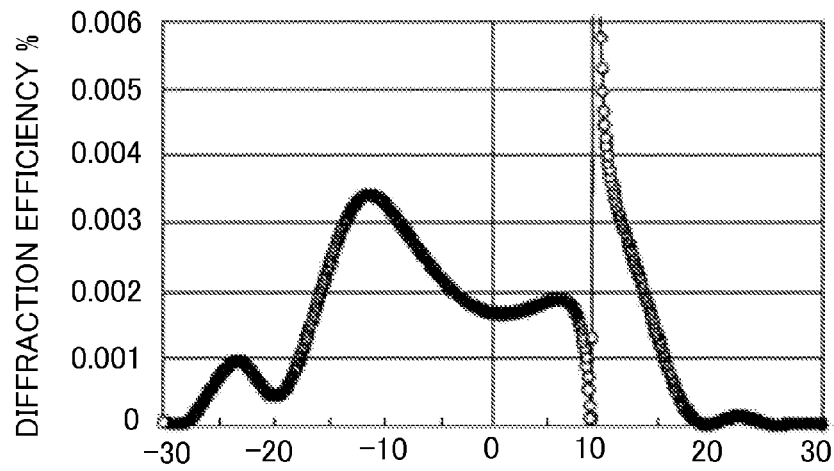
FIGS. 21A to 21C are graphs of diffraction efficiency with respect to off-screen incident luminous flux at an angle of +10 degrees in a conventional diffractive optical element of Embodiments 5 and 6.
Figure 21B:
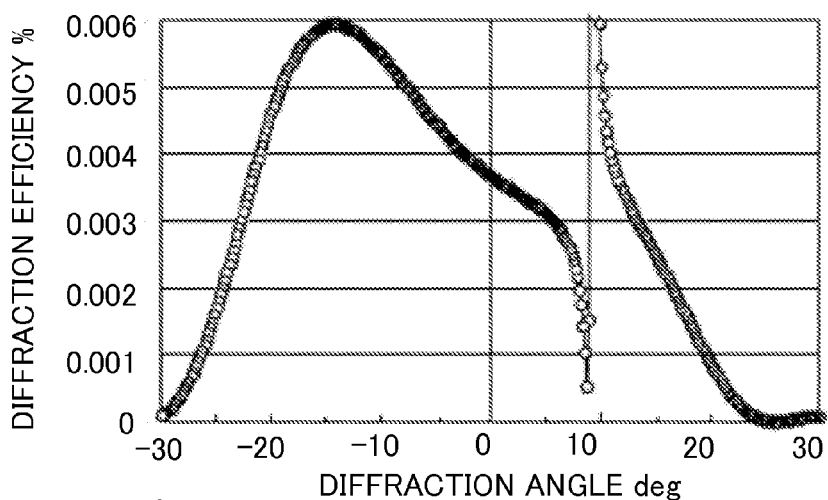

Considering luminous flux (light beam "b" in FIG. 3, and light beam "B" in FIG. 11) which enters the diffraction grating part in a downward direction at an obliquely incident angle (off-screen light incident angle) with reference to a designed incident angle, FIG. 21A illustrates an RCWA calculation result on conditions that the incident angle is +10 degrees, the grating pitch is 200 μm, and the wavelength is 550 nm. FIG. 21B illustrates an RCWA calculation result on condition that the designed order is +1st order. FIGS. 21A and 21B are results in which the vertical axes enlarge lower parts of the diffraction efficiencies and the horizontal axes indicate ranges of higher diffraction angles as diffraction angles. In both of FIGS. 21A and 21B, the unnecessary light propagates as unnecessary light having a peak in a specific angle direction.

The unnecessary light has a peak in a nearly −10 degrees direction, and its propagation direction is substantially equal to an emitting direction of −9.94 degrees in which a component of the luminous flux having the off-screen incident angle of +9.94 degrees which enters the grating wall surface is totally reflected to be propagated after being diffracted as +2nd order light on the grating surface. Because the unnecessary light enters the grating wall surface from the side of a higher refractive-index material to the side of a lower refractive-index material at +80.6 degrees larger than a critical angle of 65.2 degrees, the total reflection is generated. In FIGS. 21A and 21B, the peak angles of the unnecessary lights in the −10 degrees direction are substantially the same, but the spread of the angle of the unnecessary light in FIG. 21B has a sharper peak and the unnecessary light is concentrated on the peak.

In other words, the behaviors of the unnecessary lights having the designed orders of +1st and +2nd orders are different from each other, and it means that the unnecessary light having the designed order of +2nd order is closer to the phenomenon of the geometric optics. This relation is the same as that of Embodiments 1, 3, and 4. As illustrated in FIGS. 24, 10, and 11, the unnecessary light generated when the off-screen luminous flux enters the diffractive optical element applied to the actual optical system is as follows. The diffracted light of the unnecessary light generated by the off-screen luminous flux having a diffraction angle nearly equal to +0.17 degree where the designed diffraction order at the designed incident angle propagates reaches the imaging plane. According to the RCWA calculation result, the diffraction efficiencies at the vicinity of the diffraction angle of +0.17 degree in FIG. 21A are 0.0017% in a diffraction order of −103 (at a diffraction angle of +0.20 degree) and 0.0017% in a diffraction order of −104 (at a diffraction angle of +0.11 degree). When the designed order is +1st order, the diffraction efficiencies are 0.0036% in a diffraction order of −51 (at a diffraction angle of +0.28 degree) and 0.0037% in a diffraction order of −52 (at a diffraction angle of +0.11 degree). Thus, the diffraction efficiencies are decreased as compared with the case of the designed order of +1st order. The number of the unnecessary lights reaching the imaging plane in the designed order of +2nd order is twice as large as that in the designed order of +1st order. Therefore, the diffraction efficiency at the vicinity of the diffraction angle of +0.21 degree having the designed order of +2nd order is converted into 0.0034% that has been doubled, and it is decreased as compared with the diffraction efficiency of 0.0037% of the designed order of +1st order.

With regard to luminous flux (light beam c in FIG. 3, and light beam B' in FIG. 11) which enters the diffraction grating part in an upward direction at an obliquely incident angle (off-screen light incident angle) with reference to a designed incident angle, an RCWA calculation has been performed. The diffraction efficiencies of the unnecessary light which emits at a diffraction angle substantially equal to the diffraction angle of 0.17 degree of the designed order are 0.00067% in the diffraction order of +108 (the diffraction angle of +0.23 degree) and 0.00068% in the diffraction order of +107 (the diffraction angle of +0.15 degree). Since the diffraction efficiencies in the designed order of +1st order are 0.0014% in a diffraction order of +54 (at a diffraction angle of +0.23 degree) and 0.0014% in a diffraction order of +53 (at a diffraction angle of +0.062 degree), the diffraction efficiencies in the designed order of +2nd order are decreased as compared with those in the designed order of +1st order. The number of the unnecessary lights reaching the imaging plane in the designed order of +2nd order is twice as large as that in the designed order of +1st order. Therefore, the diffraction efficiency at the vicinity of the diffraction angle of +0.21 degree in the designed order of +2nd order is converted into 0.0014 that has been doubled. The diffraction efficiency is nearly equal to the diffraction efficiency of 0.0014% in the designed order of +1st order.

As above, in the optical system to which the diffractive optical element of the present invention is applied, when the off-screen luminous flux enters the diffractive optical element, the designed order is changed from the +1st order to the +2nd order. Thus, the unnecessary light of the m grating on which the influence of the unnecessary light illustrated in FIGS. 24, 10, and 11 is great can be reduced. The unnecessary light of the m' grating on which the influence of the unnecessary light is small can also be reduced. As a result, because the unnecessary light reaching the imaging plane is decreased, the deterioration of the image performance can be suppressed. According to Embodiment 5, the present invention is independent of the diffraction grating material and the grating height of the diffractive optical element, and the present invention is not limited to the above material and grating height.

Embodiment 6

Embodiment 6 will describe a case where the material of the diffraction grating and the grating height of the grating part are different from those in Embodiments 1 to 5. With regard to a specific configuration of the diffraction grating part, the diffraction grating 11 is formed by a grating forming material of an ultraviolet curable resin mixed with fine particles of nd=1.685, vd=7.1, θgF=0.30, and n550=1.709. The diffraction grating 12 is formed by a grating forming material using light-transmissive ceramics of nd=1.92, vd=36, θgF=0.57, and n550=1.922.

The grating height d of both the grating parts is 7.76 μm and the designed order is +3rd order. Compared with the case of the designed order of +1st order (the grating height is ⅓), the phase function is ⅓ and the grating pitch is three times in a case of the designed order of +3rd order. Thus, the emitting angles of the diffracted lights having the designed orders of +3rd order and +1st order are equal to each other, and the optical characteristics of the designed orders are equivalent to each other. Furthermore, the number of gratings is ⅓. The same is true for the designed order of +2nd order.

As a result of the RCWA calculation on conditions that the incident angle that is a designed incident angle of the diffraction grating part is zero degree (light beam "a" in FIG. 3), the grating pitch is 300 μm, and the wavelength is 550 nm, the diffraction efficiency of the diffracted light having the designed order of +3rd order is 99.60% (the diffraction angle of +0.16 degree). The diffraction efficiency of the diffracted light having the designed order of +2nd order (the material of each diffraction grating is the same, the grating height is 5.18

μm, and the grating pitch is 200 μm) is 99.53% (the diffraction angle of +0.16 degree). It is equal to or greater than the diffraction efficiency of the diffracted light having the designed order of +1st order (the material of each diffraction grating is the same, the grating height is 2.59 μm, and the grating pitch is 100 μm) that is 99.38% (the diffraction angle of +0.17 degree).

Figure 21C:
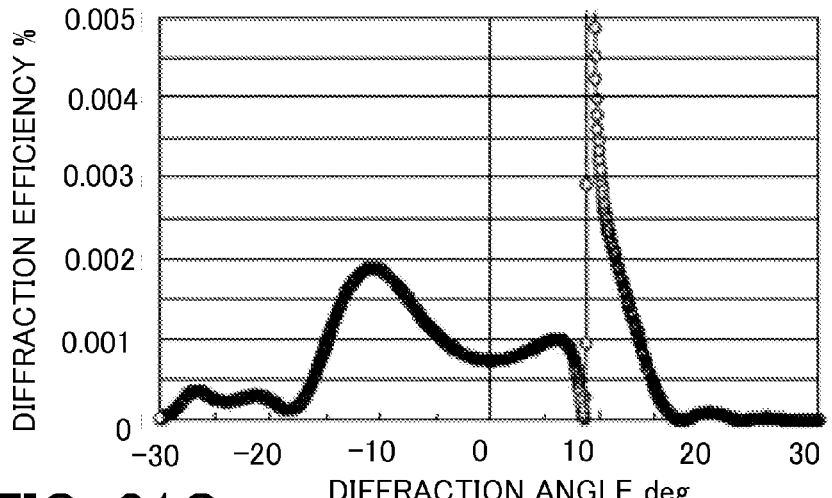
Figure 22A:
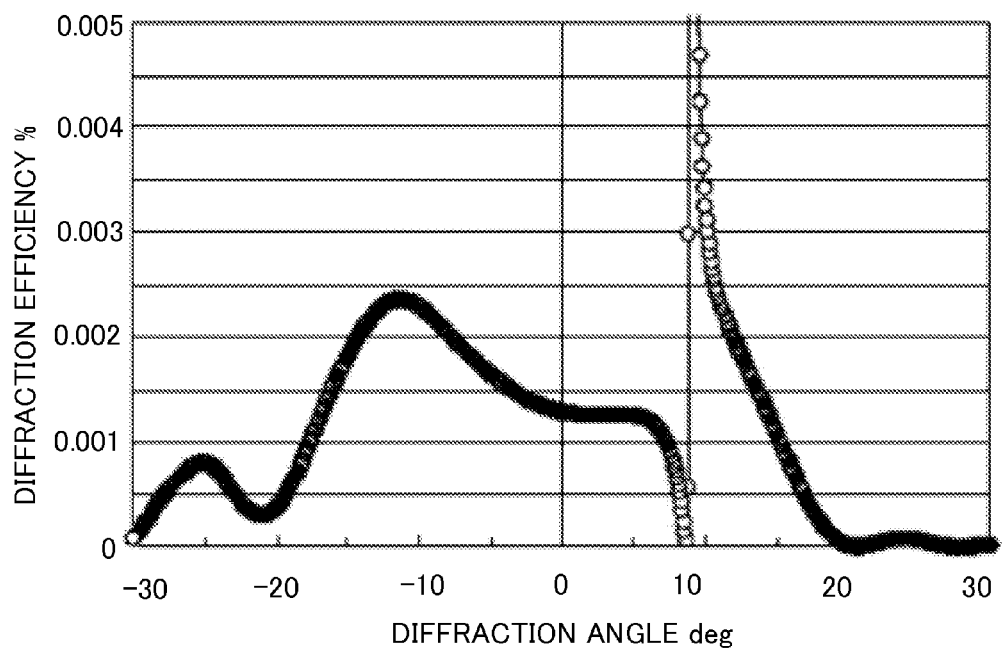
FIGS. 22A and 22B are graphs of diffraction efficiency with respect to off-screen incident luminous flux at an angle of +10 degrees in a diffractive optical element for comparison.
Figure 22B:
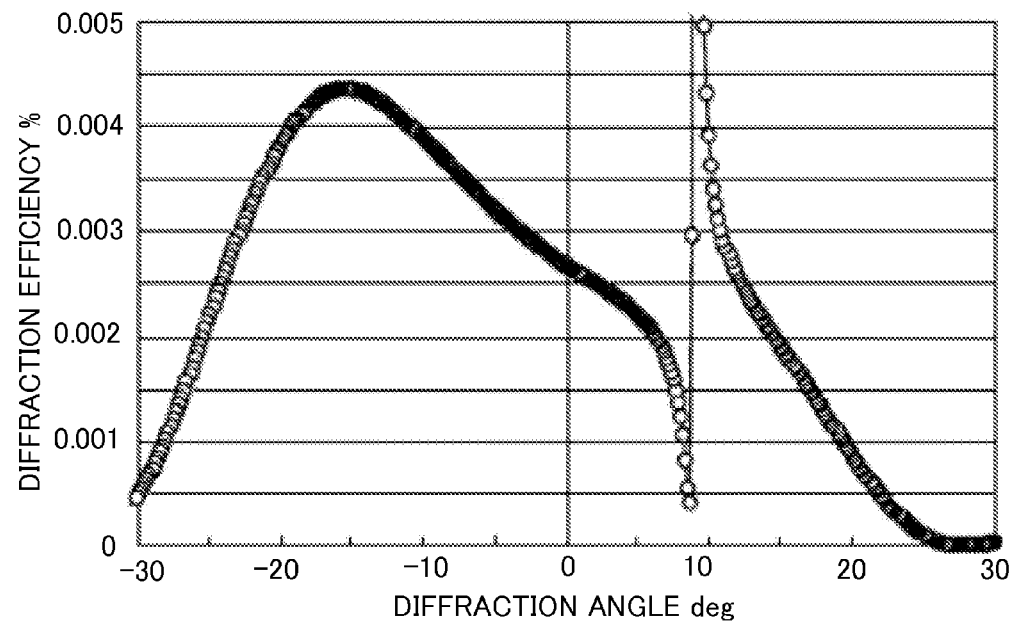

Considering luminous flux (light beam "b" in FIG. 3, and light beam "B" in FIG. 11) which enters the diffraction grating part in a downward direction at an obliquely incident angle (off-screen light incident angle) with reference to a designed incident angle, FIG. 21C illustrates an RCWA calculation result on conditions that the incident angle is +10 degrees, the grating pitch is 300 μm, and the wavelength is 550 nm. FIGS. 22A and 22B illustrate RCWA calculation results in the designed orders of +2nd and +1st orders, respectively. FIGS. 21C to 22B are results in which the vertical axes enlarge lower parts of the diffraction efficiencies and the horizontal axes indicate ranges of higher diffraction angles as diffraction angles. In all of FIGS. 21C to 22B, the unnecessary light propagates as unnecessary light having a peak in a specific angle direction.

The unnecessary light has a peak in a nearly −10 degrees direction, and its propagation direction is substantially equal to an emitting direction of −9.94 degrees in which a component of the luminous flux having the off-screen incident angle of +9.94 degrees which enters the grating wall surface is totally reflected to be propagated after being diffracted as +3rd order light on the grating surface. Because the unnecessary light enters the grating wall surface from the side of a higher refractive-index material to the side of a lower refractive-index material at +80.6 degrees larger than a critical angle of 62.8 degrees, the total reflection is generated. In FIGS. 21C to 22B, the peak angles of the unnecessary lights in the −10 degrees direction are substantially the same, but the spread of the angle of the unnecessary light has a sharper peak as the designed order is larger, and the unnecessary light is concentrated on the peak. In other words, the behaviors of the unnecessary lights having the designed orders are different from each other, and it means that the unnecessary light having larger designed order is closer to the phenomenon of the geometric optics. This relation is the same as that of Embodiments 1 to 5.

As illustrated in FIGS. 24, 10, and 11, the unnecessary light generated when the off-screen luminous flux enters the diffractive optical element applied to the actual optical system is as follows. The diffracted light of the unnecessary light generated by the off-screen luminous flux having a diffraction angle nearly equal to +0.16 degree where the designed diffraction order at the designed incident angle propagates reaches the imaging plane. According to the RCWA calculation result, the diffraction efficiency at the vicinity of the diffraction angle of +0.16 degree in FIGS. 21C to 22B is 0.00074% in a diffraction order of −158 (at a diffraction angle of +0.21 degree). The diffraction efficiency is 0.00074% in a diffraction order of −159 (at a diffraction angle of +0.16 degree). When the designed order is +2nd order, the diffraction efficiency is 0.0013% in a diffraction order of −105 (at a diffraction angle of +0.24 degree). The diffraction efficiency is 0.0013% in a diffraction order of −106 (at a diffraction angle of +0.16 degree). When the designed order is +1st order, the diffraction efficiency is 0.0027% in a diffraction order of −52 (a diffraction angle of +0.32 degree). The diffraction efficiency is 0.0027% in a diffraction order of −53 (a diffraction angle of +0.16 degree). Thus, the diffraction efficiencies are decreased as compared with the case of the designed orders of +1st or +2nd orders. The number of the unnecessary lights reaching the imaging plane in the designed order of +3rd order is three times as large as that in the designed order of +1st order. Therefore, the diffraction efficiency at the vicinity of the diffraction angle of +0.21 degree having the designed order of +3rd order is converted into 0.0022% that has been tripled, but it is decreased as compared with the diffraction efficiency of 0.0027% of the designed order of +1st order. The diffraction efficiency at the vicinity of the diffraction angle of +0.21 degree having the designed order of +2nd order is converted into 0.0027% that has been doubled, and it is nearly equal as compared with the diffraction efficiency of 0.0027% of the designed order of +1st order.

With regard to luminous flux (light beam c in FIG. 3, and light beam B' in FIG. 11) which enters the diffraction grating part in an upward direction at an obliquely incident angle (off-screen light incident angle) with reference to a designed incident angle, an RCWA calculation has been performed. The diffraction efficiencies of the unnecessary light which emits at a diffraction angle substantially equal to the diffraction angle of 0.17 degree of the designed order are 0.00034% in the diffraction order of +165 (the diffraction angle of +0.17 degree) and 0.00035% in the diffraction order of +164 (the diffraction angle of +0.11 degree). The diffraction efficiencies in the designed order of +2nd order are 0.00061% in a diffraction order of +110 (at a diffraction angle of +0.17 degree) and 0.00061% in a diffraction order of +109 (at a diffraction angle of +0.088 degree). The diffraction efficiencies in the designed order of +1st order are 0.0012% in a diffraction order of +55 (at a diffraction angle of +0.17 degree) and 0.0012% in a diffraction order of +54 (at a diffraction angle of +0.056 degree). As above, the diffraction efficiencies are decreased as compared with those in the designed orders of +2nd and +1st orders. The number of the unnecessary lights reaching the imaging plane in the designed order of +3rd order is three times as large as that in the designed order of +1st order. Therefore, the diffraction efficiency at the vicinity of the diffraction angle of +0.21 degree in the designed order of +3rd order is converted into 0.0010 that has been tripled. The diffraction efficiency at the vicinity of the diffraction angle of +0.21 degree in the designed order of +2nd order is converted into 0.0012 that has been doubled, and the diffraction efficiency is nearly equal to the diffraction efficiency of 0.0012% in the designed order of +1st order.

As above, in the optical system to which the diffractive optical element of the present invention is applied, when the off-screen luminous flux enters the diffractive optical element, the unnecessary light of the m grating on which the influence of the unnecessary light illustrated in FIGS. 24, 10, and 11 is great can be reduced by increasing the designed order. The unnecessary light of the m' grating on which the influence of the unnecessary light is small can also be reduced. As a result, because the unnecessary light reaching the imaging plane is decreased, the deterioration of the image performance can be suppressed.

In Embodiment 6, when the thickness of the grating is small, the converted diffraction efficiency of the unnecessary light caused by the off-screen luminous flux which reaches the imaging plane (the efficiency of the diffracted light reaching the imaging plane×the designed order) is not low with respect to the designed order of +1st order and a reduction effect of the unnecessary light cannot be obtained even if the designed order is +2nd order. Therefore, it is preferable that the diffraction grating part of the present invention has the designed order equal to or greater than +2nd order and that the grating height is equal to or greater than 6 μm.

In Embodiments 1 to 6, when viewing FIGS. 13, 20A, 20C, 21A, and 22A that illustrate the RCWA calculation results of the off-screen luminous flux having the designed order of +2nd order which enters the diffraction grating part at the incident angle of +10 degrees, the followings are understood. As the grating height of the grating part is lower, the peak of the unnecessary light is not concentrated. An important point of the present invention is to reduce the unnecessary light reaching the imaging plane using the phenomenon that the unnecessary light is concentrated on the peak. In Embodiment 6, as the designed order is greater, the diffraction efficiency of the unnecessary light caused by the off-screen luminous flux which is nearly equal to the diffraction angle at which the designed diffracted light propagates is reduced.

However, each value of the diffraction order and the diffraction angle at which the unnecessary light of the off-screen incident light is different in accordance with the optical system and the position of the stop behind the diffraction grating part. Therefore, when it is applied to many types of optical systems, it is preferable that the peak of the unnecessary light is concentrated to be close to the phenomenon of the geometric optics to be configured so as to control the unnecessary light. The unnecessary light can be controlled by shifting the angle of the grating wall surface of the diffraction grating from a principal ray direction, gradually changing the angle of the grating wall surface, changing the shape of the grating wall surface into a stepped shape, or the like. For example, the shape of the grating wall surface is configured to be changed from a center region to a peripheral region.

As a result, the unnecessary light reaching the imaging plane can be suppressed with respect to many types of optical systems. Considering the concentration of the peak of the unnecessary light, in the RCWA calculation result, it is preferable that the diffraction angle (+10 degrees) of the designed order is separated from the peak angle (−10 degrees) of the unnecessary light and that there is a local minimal point between them. In view of this, comparing FIG. 21A with FIG. 22A, it is preferable that the diffraction grating part of the present invention has the designed order equal to or greater than +2nd order and that the grating height is equal to or greater than 6 μm.

On the other hand, it is necessary to improve the diffraction efficiency of the diffracted light having the designed order of m-th order with respect to the designed incident angle luminous flux over an entire visible wavelength range. Therefore, it is preferable that a value of Expression (11) which is obtained by dividing a difference of the optical path lengths of the diffraction gratings by the product of the wavelength satisfies the following Expression (12).

$$\{n2(\lambda)-n1(\lambda)\} \times d/\lambda \tag{11}$$

$$n1(\lambda) < n2(\lambda),$$

$$-6.667E{-}04 \times m^4 + 1.000E{-}02 \times m^3 - 5.667E{-}04 \times m^2 + 1.500E{-}01 \times m + 0.8173 \le \{n2(\lambda)-n1(\lambda)\} \times d/\lambda \le + 6.667E{-}04 \times m^4 - 1.000E{-}02 \times m^3 + 5.667E{-}04 \times m^2 - 1.500E{-}01 \times m + 1.183 \tag{12}$$

In the above expressions, m is an integer equal to or greater than 2, d is a grating height, n1(λ) is a refractive index of the material constituting the first diffraction grating of the diffraction grating part at the wavelength λ. Furthermore, n2(λ) is a refractive index of the material constituting the second diffraction grating of the diffractive optical element at the wavelength λ, and λ is an arbitrary wavelength in the visible wavelength range. In this range, the diffraction efficiency equal to or greater than 97% is obtained by a rigorous wave calculation on conditions that the designed order is +1st order and that the grating pitch is 100 μm. As the designed order of m is greater, the decrease of the diffraction efficiency when the parameters (the refractive index, the grating thickness, and the wavelength) are changed is large. Therefore, Expression (12) depends on the designed order of m. In zones having a wide grating pitch, since the contribution of the wall surface is small, the diffraction efficiency of the designed order is higher and the diffraction efficiency of the unnecessary light is lower. Therefore, the diffraction efficiency of the designed order of +1st order and the grating pitch of 100 μm is described as one reference, and the reduction of the unnecessary light at the designed incident angle does not influence on the image performance if the diffraction efficiency is equal to or greater than 97% in the rigorous electromagnetic field calculation on condition that the grating pitch is 100 μm. If the value exceeds the range defined by Expression (12), it is not preferable because the unnecessary diffraction efficiency increases. Additionally, it is preferable that the diffractive optical element satisfies the following expression.

$$-5.000E{-}04 \times m^4 + 7.500E{-}02 \times m^3 - 4.250E{-}04 \times m^2 + 1.125E{-}01 \times m + 0.863 \le \{n2(\lambda)-n1(\lambda)\} \times d/\lambda \le + 5.000E{-}04 \times m^4 - 7.500E{-}02 \times m^3 + 4.250E{-}04 \times m^2 - 1.125E{-}01 \times m + 1.137 \tag{13}$$

This range is preferable because the diffraction efficiency is equal to or greater than 98% in the rigorous electromagnetic field calculation on conditions that the designed order of +1st order and that the grating pitch is 100 μm.

Figure 25:
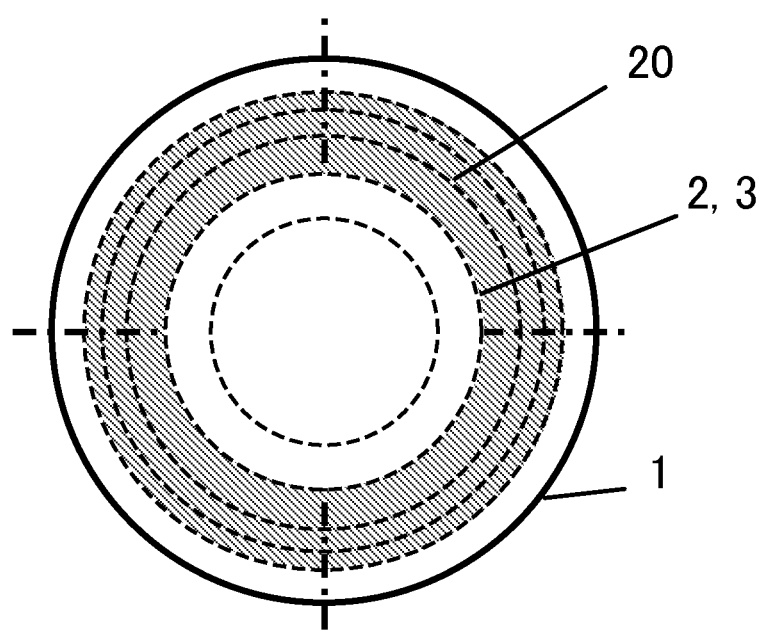
FIG. 25 is a main cross-sectional diagram of a diffractive optical element.

It is not necessary that the designed orders are equal to or greater than +2nd order for all zones, and the designed orders having at least +2nd order may be applicable only to a part of the zones. In this case, it is effective that a part of the designed orders containing the minimum grating pitch as illustrated in FIG. 25 are set to be equal to or greater than +2nd order. This is because the diffraction grating having a small grating pitch has a large diffraction efficiency of the unnecessary light and therefore the contribution of the unnecessary light generated in a whole of the diffractive optical element is large.

Numerical embodiments of Embodiments 1 to 6 described above will be described with reference to Tables 1 to 3. Each of Tables 1 to 3 describes a material of the first diffraction grating used as the diffraction grating part of Embodiments 1 to 6, a refractive index nd1 of the material in using a d-line, Abbe number vd1, a partial dispersion ratio θgF1 with respect to a g-line and an F-line, and a refractive index n1__550 at a wavelength of 550 nm. Each of Tables 1 to 3 also describes a material of the second diffraction grating, a refractive index nd2 of the material in using the d-line, Abbe number vd2, and a refractive index n2__550 at the wavelength of 550 nm. Furthermore, each of Tables 1 to 3 describes the designed order of the luminous flux having the designed incident angle of zero degree, the designed diffraction angle, and the diffraction efficiency at a pitch of 100 μm obtained by the RCWA calculation in the grating height d of the diffraction grating part of Embodiments 1 to 6 and at the wavelength of 550 nm. Additionally, Each of Tables 1 to 3 describes the diffraction order of the diffracted light reaching the imaging plane with respect to the off-screen incident luminous flux at an angle of +10 degrees, the diffraction angle, the diffraction efficiency obtained by the RCWA calculation, the converted diffraction efficiency (the efficiency of the diffracted light reaching the imaging plane×the designed order), and the value obtained by Expression (11). Table 1 describes Embodiments 1 to 3, Table 2 describes Embodiments 4 and 5, and Table 3 describes Embodiment 6.

As described in Embodiments 1 to 6, in a case where the unnecessary light is generated by the off-screen incident luminous flux at an angle of +10 degrees and the diffraction efficiency of the order reaching the imaging plane is at least +2nd order and the grating height is at least 6 μm, the converted diffraction efficiency is small. On the other hand, in the entire visible wavelength range, the numerical range of Expression (11) to improve the diffraction efficiency of the diffracted light having m-th order that is a designed order with respect to the designed incident angle luminous flux is in a range of Expression (12). It is preferable that the material of the diffraction grating part is selected so as to satisfy the following relations of the Abbe number vd1 of the material forming the first diffraction grating 11 and the Abbe number vd2 of the material forming the second diffraction grating 12.

$$vd1 \leq 25$$

$$30 \leq vd2$$

If the Abbe number exceeds the above range, it is not preferable that the high diffraction efficiency cannot be obtained over the entire visible range. In addition, it is preferable that a partial dispersion ratio $\theta gF1$ of the first diffraction grating 11 satisfies the following expression.

$$\theta gF1 \leq (-1.665E{-}07 \times vd1^3 + 5.213E{-}05 \times vd1^2 - 5.656E{-}03 \times vd1 + 0.675) \quad (14)$$

If the partial dispersion ratio $\theta gF1$ exceeds the range of Expression (14), the diffraction efficiency of the +1st order light is deteriorated over the entire visible range. Accordingly, it is preferable that Expression (14) is satisfied.

Embodiment 7

Figure 23A:
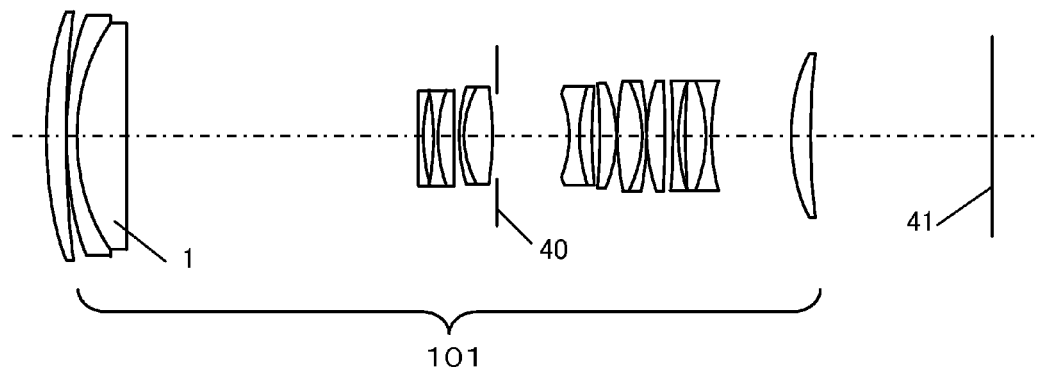
FIGS. 23A and 23B are an image pickup optical system in Embodiment 7 and an observation optical system in Embodiment 8, respectively.

FIG. 23A illustrates a schematic diagram of an optical system in Embodiment 7 using the diffractive optical element of the present invention. FIG. 23A illustrates a cross section of an image pickup optical system (an image-forming lens) such as a camera. In FIG. 23A, reference numeral 101 denotes an image-forming lens, which includes a stop 40, the diffractive optical element 1 of each of the above embodiments, and a refractive optical part inside it. The stop 40 is arranged at an image side of the diffractive optical element 1. Reference numeral 41 denotes an imaging plane on which a film or a CCD is disposed. The optical system is configured so that a center of gravity of the distribution of the incident angles of the luminous flux entering the diffraction grating part of the diffractive optical element 1, which is equivalent to a center of gravity of a graphic, is distributed nearer the center of the diffraction grating part with respect to a plane normal at the center of the diffraction grating of the envelope surface.

When the diffraction grating part of the present invention is applied, a high-performance image-forming lens with few flare and with high resolution can be obtained because the generation of the unnecessary light is significantly suppressed even if the luminous flux enters the grating wall surface. Since the diffractive optical element of the present invention can be made with a simple manufacturing method, an optical system having good mass production can be provided as an image pickup optical system. In FIG. 23A, the diffractive optical element 1 is provided on a bonded surface of a front lens, but the present embodiment is not limited to this, and the diffractive optical element 1 may be provided on a lens surface and a plurality of diffractive optical elements may be used in the image-forming lens. The present embodiment describes the image-forming lens of a camera, but is not limited to this and the same effect can be obtained even if it is used as an imaging optical system of an optical apparatus which is used in a wide wavelength range such as an image scanner of an office equipment or a reader lens of a copy machine.

Embodiment 8

Figure 23B:
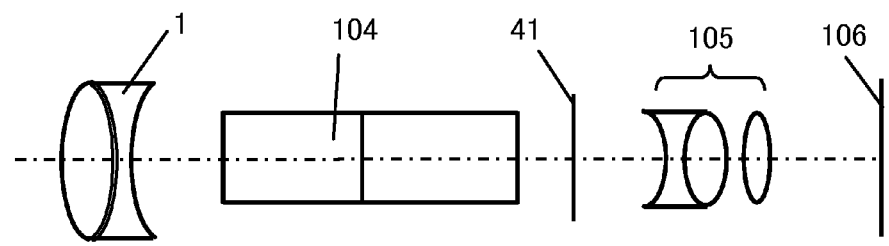

FIG. 23B illustrates a schematic diagram of an optical system in Embodiment 8 using the diffractive optical element of the present invention. FIG. 23B illustrates a cross section of an observation optical system such as binoculars. In FIG. 23B, reference numeral 1 denotes an objective lens constituted of the diffractive optical element, reference numeral 104 denotes a prism as an image reversal part for erecting an image, reference numeral 105 denotes an eyepiece lens, and reference numeral 106 denotes an evaluation surface (a pupil surface). The diffractive optical element 1 is used for correcting a chromatic aberration or the like on an imaging plane 41. When the diffraction grating part of the present invention is applied, a high-performance objective lens with few flare and with high resolution can be obtained because the generation of the unnecessary light is significantly suppressed even if the luminous flux enters the grating wall surface. Since the diffractive optical element of the present invention can be made with a simple manufacturing method, an optical system having good mass production can be provided as an observation optical system.

The present embodiment describes the case where the diffractive optical element is used as the objective lens 1, but is not limited to this. The same effect can be obtained even if the diffractive optical element is used on a surface of the prism or inside the eyepiece lens. When it is provided at an object side with reference to the imaging plane, the effect of reducing the chromatic aberration can be obtained only by the objective lens. Therefore, when it is an observation system by the naked eye, it is preferably provided at the objective lens side. The present embodiment describes the binoculars, but is not limited to this and may also be applied to a ground-based telescope, an astronomical observation telescope, or the like. Additionally, the same effect can be obtained by an optical finder such as a lens shutter camera or a video camera.

TABLE 1

|  | EMBODIMENT 1 | COMPARATIVE EXAMPLE | EMBODIMENT 2 | EMBODIMENT 3 | COMPARATIVE EXAMPLE |
|---|---|---|---|---|---|
| nd1 | 1.479 | 1.479 | 1.479 | 1.504 | 1.504 |
| vd1 | 20.7 | 20.7 | 20.7 | 16.3 | 16.3 |
| $\theta gF1$ | 0.404 | 0.404 | 0.404 | 0.390 | 0.390 |
| nd1_550 | 1.483 | 1.483 | 1.483 | 1.511 | 1.511 |
| nd2 | 1.522 | 1.522 | 1.522 | 1.567 | 1.567 |
| vd2 | 51.3 | 51.3 | 51.3 | 47.0 | 47.0 |
| nd2_550 | 1.524 | 1.524 | 1.524 | 1.570 | 1.570 |
| GRATING HEIGHT d (μm) | 27.02 | 13.51 | 40.52 | 18.57 | 9.29 |
| ZERO DEGREE INCIDENCE DESIGNED ORDER | +2 | +1 | +3 | +2 | +1 |
| ZERO DEGREE INCIDENCE DESIGNED ORDER DIFFRACTION ANGLE (DEGREE) | 0.21 | 0.21 | 0.21 | 0.20 | 0.20 |

TABLE 1-continued

|  | EMBODIMENT 1 | COMPARATIVE EXAMPLE | EMBODIMENT 2 | EMBODIMENT 3 | COMPARATIVE EXAMPLE |
| --- | --- | --- | --- | --- | --- |
| ZERO DEGREE INCIDENCE DESIGNED ORDER DIFFRACTION EFFICIENCY (%) | 98.85 | 98.49 | 99.20 | 99.05 | 98.76 |
| CONDITIONAL EXPRESSION (10) | −91.7 | −45.8 | −137.5 | −93.4 | −46.7 |
| +10 DEGREE INCIDENCE ORDER REACHING IMAGING PLANE nm1 | −91 | −45 | −137 | −93 | −46 |
| +10 DEGREE INCIDENCE ORDER REACHING IMAGING PLANE nm1 DIFFRACTION ANGLE (DEGREE) | 0.27 | 0.38 | 0.24 | 0.24 | 0.34 |
| +10 DEGREE INCIDENCE ORDER REACHING IMAGING PLANE nm1 DIFFRACTION EFFICIENCY (%) | 0.0017 | 0.021 | 0.0014 | 0.0015 | 0.014 |
| +10 DEGREE INCIDENCE ORDER REACHING IMAGING PLANE nm2 | −92 | −46 | −138 | −94 | −47 |
| +10 DEGREE INCIDENCE ORDER REACHING IMAGING PLANE nm2 DIFFRACTION ANGLE (DEGREE) | 0.17 | 0.17 | 0.017 | 0.14 | 0.14 |
| +10 DEGREE INCIDENCE ORDER REACHING IMAGING PLANE nm2 DIFFRACTION EFFICIENCY (%) | 0.0017 | 0.021 | 0.0014 | 0.0015 | 0.014 |
| +10 DEGREE INCIDENCE REACHING IMAGING PLANE CONVERTED DIFFRACTION EFFICIENCY (%) | 0.0034 | 0.021 | 0.0042 | 0.0030 | 0.014 |
| CONDITIONAL EXPRESSION (11): 430 nm | 2.00 | 1.00 | 3.00 | 1.99 | 0.99 |
| CONDITIONAL EXPRESSION (11): 550 nm | 1.99 | 0.99 | 2.98 | 1.98 | 0.99 |
| CONDITIONAL EXPRESSION (11): 670 nm | 2.04 | 1.02 | 3.05 | 2.01 | 1.00 |

TABLE 2

|  | EMBODIMENT 4 | COMPARATIVE EXAMPLE | EMBODIMENT 5 | COMPARATIVE EXAMPLE |
| --- | --- | --- | --- | --- |
| nd1 | 1.682 | 1.682 | 1.652 | 1.652 |
| vd1 | 13.4 | 13.4 | 9.6 | 9.6 |
| θgF1 | 0.480 | 0.480 | 0.37 | 0.37 |
| nd1_550 | 1.694 | 1.694 | 1.667 | 1.667 |
| nd2 | 1.810 | 1.810 | 1.83 | 1.83 |
| vd2 | 41.0 | 41.0 | 52 | 52 |
| nd2_550 | 1.814 | 1.814 | 1.836 | 1.836 |
| GRATING HEIGHT d (μm) | 9.11 | 4.56 | 6.51 | 3.26 |
| ZERO DEGREE INCIDENCE DESIGNED ORDER | +2 | +1 | +2 | +1 |
| ZERO DEGREE INCIDENCE DESIGNED ORDER DIFFRACTION ANGLE (DEGREE) | 0.17 | 0.17 | 0.17 | 0.17 |
| ZERO DEGREE INCIDENCE DESIGNED ORDER DIFFRACTION EFFICIENCY (%) | 99.37 | 99.18 | 99.47 | 99.30 |
| CONDITIONAL EXPRESSION (10) | −104.9 | −52.5 | −103.3 | −51.6 |
| +10 DEGREE INCIDENCE ORDER REACHING IMAGING PLANE nm1 | −104 | −52 | −103 | −51 |

TABLE 2-continued

|  | EMBODIMENT 4 | COMPARATIVE EXAMPLE | EMBODIMENT 5 | COMPARATIVE EXAMPLE |
|---|---|---|---|---|
| +10 DEGREE INCIDENCE ORDER REACHING IMAGING PLANE nm1 DIFFRACTION ANGLE (DEGREE) | 0.25 | 0.25 | 0.19 | 0.28 |
| +10 DEGREE INCIDENCE ORDER REACHING IMAGING PLANE nm1 DIFFRACTION EFFICIENCY (%) | 0.0020 | 0.0055 | 0.0017 | 0.0036 |
| +10 DEGREE INCIDENCE ORDER REACHING IMAGING PLANE nm2 | −105 | −53 | −104 | −52 |
| +10 DEGREE INCIDENCE ORDER REACHING IMAGING PLANE nm2 DIFFRACTION ANGLE (DEGREE) | 0.17 | 0.081 | 0.11 | 0.11 |
| +10 DEGREE INCIDENCE ORDER REACHING IMAGING PLANE nm2 DIFFRACTION EFFICIENCY (%) | 0.0020 | 0.0056 | 0.0017 | 0.0037 |
| +10 DEGREE INCIDENCE REACHING IMAGING PLANE CONVERTED DIFFRACTION EFFICIENCY (%) | 0.0040 | 0.0055 | 0.0034 | 0.0036 |
| CONDITIONAL EXPRESSION (11): 430 nm | 1.99 | 1.00 | 1.99 | 1.00 |
| CONDITIONAL EXPRESSION (11): 550 nm | 2.02 | 1.01 | 2.00 | 1.00 |
| CONDITIONAL EXPRESSION (11): 670 nm | 1.94 | 0.97 | 2.01 | 1.00 |

TABLE 3

|  | EMBODIMENT 6 | COMPARATIVE EXAMPLE | COMPARATIVE EXAMPLE |
|---|---|---|---|
| nd1 | 1.685 | 1.685 | 1.685 |
| vd1 | 7.1 | 7.1 | 7.1 |
| θgF1 | 0.30 | 0.30 | 0.30 |
| nd1_550 | 1.709 | 1.709 | 1.709 |
| nd2 | 1.92 | 1.92 | 1.92 |
| vd2 | 41.0 | 41.0 | 52 |
| nd2_550 | 1.918 | 1.922 | 1.922 |
| GRATING HEIGHT d (μm) | 7.76 | 5.18 | 2.59 |
| ZERO DEGREE INCIDENCE DESIGNED ORDER | +3 | +2 | +1 |
| ZERO DEGREE INCIDENCE DESIGNED ORDER DIFFRACTION ANGLE (DEGREE) | 0.17 | 0.17 | 0.17 |
| ZERO DEGREE INCIDENCE DESIGNED ORDER DIFFRACTION EFFICIENCY (%) | 99.60 | 99.53 | 99.38 |
| CONDITIONAL EXPRESSION (10) | −158.9 | −105.9 | −52.9 |
| +10 DEGREE INCIDENCE ORDER REACHING IMAGING PLANE nm1 | −158 | −105 | −52 |
| +10 DEGREE INCIDENCE ORDER REACHING IMAGING PLANE nm1 DIFFRACTION ANGLE (DEGREE) | 0.21 | 0.24 | 0.32 |
| +10 DEGREE INCIDENCE ORDER REACHING IMAGING PLANE nm1 DIFFRACTION EFFICIENCY (%) | 0.00074 0.00222 | 0.0013 0.0027 | 0.0027 |
| +10 DEGREE INCIDENCE ORDER REACHING IMAGING PLANE nm2 | −159 | −106 | −53 |
| +10 DEGREE INCIDENCE ORDER REACHING IMAGING PLANE nm2 DIFFRACTION ANGLE (DEGREE) | 0.16 | 0.16 | 0.16 |
| +10 DEGREE INCIDENCE ORDER REACHING IMAGING PLANE nm2 DIFFRACTION EFFICIENCY (%) | 0.00074 | 0.0013 | 0.0027 |
| +10 DEGREE INCIDENCE REACHING IMAGING PLANE CONVERTED DIFFRACTION EFFICIENCY (%) | 0.0022 | 0.0027 | 0.0027 |
| CONDITIONAL EXPRESSION (11): 430 nm | 3.02 | 2.01 | 1.07 |
| CONDITIONAL EXPRESSION (11): 550 nm | 2.95 | 1.69 | 0.98 |
| CONDITIONAL EXPRESSION (11): 670 nm | 3.04 | 2.03 | 1.01 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-165610, filed on Jul. 14, 2009, which is hereby incorporated by reference herein in its entirety.

What is claimed is:

1. A diffractive optical element comprising:
a diffraction grating part including first and second diffraction gratings laminated to each other and made of two different materials, the first and second diffraction gratings being in contact with each other,
wherein the diffraction grating part has a designed order of at least +2nd order and has a grating height of at least 6 μm, and
wherein the diffractive optical element has a highest diffraction efficiency for diffracted light of the at least +2nd designed order.

2. A diffractive optical element according to claim 1,
wherein, when integers nm1 and nm2 adjacent to m' satisfy nm1>nm2, a product of each diffraction efficiency of diffracted light having nm1-th order and nm2-th order of the diffraction grating part of a designed order m and the designed order m is lower than both diffraction efficiencies of diffracted light having n11-th order and n12-th order of the diffraction grating part of the designed order of +1,
where $m'=m+P \times n0(\lambda) \times (\sin\theta1 - \sin\theta1')/\lambda$, and
where m is the designed order which is an integer of at least 2, P is a grating pitch of the diffraction grating part, $\lambda$ is an arbitrary wavelength in a visible wavelength range, $n0(\lambda)$ is a refractive index of a material of a diffraction grating at an incident side of the first and second diffraction gratings at the wavelength $\lambda$, $\theta 1$ is a designed incident angle, and $\theta 1'$ is an obliquely incident angle.

3. A diffractive optical element according to claim 1,
wherein a phase transformation function of a wavefront by the diffraction grating part satisfies $\phi m(r)=\{(\phi 1(r)\}/m$,
where m is the designed order and $\phi m(r)$ is a phase function of the diffraction grating part in the designed order m.

4. A diffractive optical element according to claim 2, wherein the visible wavelength range is a range from a g-line to a C-line.

5. A diffractive optical element according to claim 1, wherein the Abbe number vd1 of the material of the first diffraction grating satisfies $vd1 \leq 25$.

6. A diffractive optical element according to claim 1, wherein the Abbe number vd2 of the material of the second diffraction grating satisfies $30 \leq vd2$.

7. A diffractive optical element according to claim 1,
wherein $\theta gF1 \leq (-1.665E-07 \times vd1^3 + 5.213E-05 \times vd1^2 - 5.656E-03 \times vd1 + 0.675)$ is satisfied,
where vd1 is the Abbe number of the material constituting the first diffraction grating, and $\theta gF1$ is a partial dispersion ratio of the material of the first diffraction grating with respect to a g-line and an F-line.

8. A diffractive optical element according to claim 1, wherein zones are formed at a part including the minimum grating pitch.

9. A diffractive optical element according to claim 1, wherein shapes of grating wall surfaces of the first and second diffraction gratings are changed from a central region to a peripheral region.

10. A diffractive optical element according to claim 1, wherein the first and second diffraction gratings are formed on a substrate having a lens function.

11. An optical apparatus, comprising:
a diffractive optical element including a diffraction grating part including first and second diffraction gratings laminated to each other and made of two different materials, the first and second diffraction gratings being in contact with each other; and
a refractive optical part,
wherein the diffraction grating part has a designed order of at least +2nd order and has a grating height of at least 6 μm, and
wherein the diffractive optical element has a highest diffraction efficiency for diffracted light of the at least +2nd designed order.

12. An optical apparatus, comprising:
a diffractive optical element including a diffraction grating part including first and second diffraction gratings laminated to each other and made of two different materials, the first and second diffraction gratings being in contact with each other; and
a stop positioned at an image side relative to the diffractive optical element,
wherein the diffraction grating part has a designed order of at least +2nd order and has a grating height of at least 6 μm, and
wherein the diffractive optical element has a highest diffraction efficiency for diffracted light of the at least +2nd designed order.

* * * * *